(12) United States Patent
Iwamoto et al.

(10) Patent No.: US 9,354,839 B2
(45) Date of Patent: May 31, 2016

(54) STORAGE MEDIUM STORING OBJECT MOVEMENT CONTROLLING PROGRAM AND INFORMATION PROCESSING APPARATUS

(75) Inventors: Daiki Iwamoto, Kyoto (JP); Masahiro Nitta, Kyoto (JP); Youhei Fujino, Kyoto (JP)

(73) Assignee: NINTENDO CO., LTD., Kyoto-shi (JP)

( * ) Notice: Subject to any disclaimer, the term of this patent is extended or adjusted under 35 U.S.C. 154(b) by 2335 days.

(21) Appl. No.: 11/407,102

(22) Filed: Apr. 20, 2006

(65) Prior Publication Data

US 2007/0018968 A1    Jan. 25, 2007

(30) Foreign Application Priority Data

Jul. 19, 2005   (JP) .................................. 2005-207973

(51) Int. Cl.
| | |
|---|---|
| G06F 3/14 | (2006.01) |
| A63F 13/00 | (2014.01) |
| G06F 3/0481 | (2013.01) |
| G06F 3/0488 | (2013.01) |

(52) U.S. Cl.
CPC .............. *G06F 3/1438* (2013.01); *A63F 13/00* (2013.01); *G06F 3/0488* (2013.01); *G06F 3/04815* (2013.01); *G06F 3/04883* (2013.01); *A63F 2300/1075* (2013.01); *A63F 2300/301* (2013.01); *A63F 2300/307* (2013.01); *A63F 2300/6045* (2013.01); *A63F 2300/646* (2013.01)

(58) Field of Classification Search
CPC . G06F 3/1438; G06F 3/0488; G06F 3/04883; G06F 3/04815; A63F 13/00; A63F 2300/464; A63F 2300/6045; A63F 2300/307; A63F 2300/301
USPC ................... 345/419–427; 463/30–33, 36–38
See application file for complete search history.

(56) References Cited

U.S. PATENT DOCUMENTS

| | | | |
|---|---|---|---|
| 6,966,837 B1 * | 11/2005 | Best ................................ | 463/33 |
| 2003/0216177 A1 * | 11/2003 | Aonuma et al. ............... | 463/32 |

FOREIGN PATENT DOCUMENTS

| | | |
|---|---|---|
| JP | 08-115157 | 5/1996 |
| JP | 11-235466 | 8/1999 |
| JP | 2001-202174 | 7/2001 |

(Continued)

OTHER PUBLICATIONS

Nintendo DS "Touch! Kirby" released in Mar. 2005 (URL:http://www.nintendo.co.jp/ds/atkj/sousa/index.html), 3 pages.

(Continued)

*Primary Examiner* — Aneeta Yodichkas
*Assistant Examiner* — Saifeldin Elnafia
(74) *Attorney, Agent, or Firm* — Nixon & Vanderhye P.C.

(57) ABSTRACT

An information processing apparatus includes a touch panel, for example, set on a display screen. For example, the display screen displays a three-dimensional game screen showing a relatively narrower range of a virtual three-dimensional game world and a two-dimensional map screen showing a relatively wider range of the virtual three-dimensional game world simultaneously or through change. When an object existing in the virtual three-dimensional game world is moved, an input trace is obtained from an input to the map screen by utilizing the touch panel. The object is moved along the obtained input trace, and a scene in which the object is moving is displayed on the three-dimensional game screen.

56 Claims, 16 Drawing Sheets

(56) References Cited

FOREIGN PATENT DOCUMENTS

| | | |
|---|---|---|
| JP | 2005-84862 | 3/2005 |
| WO | 00/49579 | 8/2000 |

OTHER PUBLICATIONS

Office Action issued Aug. 4, 2009 in corresponding Japanese Application No. 2005-207973.

"Egg Monster HERO Instruction Manual" by Square Enix on Mar. 31, 2005, pp. 1-43, with a partial translastion.

Office Action (4 pgs.) dated Sep. 27, 2011 issued in JP 2009-141849 (a divisional of corresponding JP Application No. 2005-207973).

"Scrath! Viewtiful Joe (Tentative)" Dengeki Game Cube, Media Works, Jun. 23, 2005, vol. 5, No. 12, p. 54 (with English-language translation thereof).

* cited by examiner

FIG. 12

INPUT TRACE DATA

| COORDINATES COUNTER VALUE | TOUCH COORDINATES $(Xa, Ya)$ | TRANSFORMATION COORDINATES $(xa, 0, za)$ |
|---|---|---|
| 1 | $(X1, Y1)$ | $((X1-P) \times k, 0, (Y1-Q) \times k)$ |
| 2 | $(X2, Y2)$ | $((X2-P) \times k, 0, (Y2-Q) \times k)$ |
| ⋮ | ⋮ | ⋮ |
| n | $(Xn, Yn)$ | $((Xn-P) \times k, 0, (Yn-Q) \times k)$ |

STORAGE MEDIUM STORING OBJECT MOVEMENT CONTROLLING PROGRAM AND INFORMATION PROCESSING APPARATUS

CROSS REFERENCE OF RELATED APPLICATION

The disclosure of Japanese Patent Application No. 2005-207973 is incorporated herein by reference.

BACKGROUND

1. Field

Example embodiments of the present invention relate to a storage medium storing an object movement controlling program and an information processing apparatus. More specifically, example embodiments of the present invention relate to a storage medium storing an object movement controlling program and an information processing apparatus capable of moving an object along an input trace.

2. Description of the Related Art

One example of a technique for moving an object displayed on a screen with a touch panel along an input trace is adopted in a game soft for Nintendo DS "Touch! Kirby" released in March, 2005 (URL:http://www.nintendo.co.jp/ds/atkj/sousa/index.html). More specifically, a trace on the screen with an object displayed is rendered by utilizing a touch panel, and if an object exists within a fixed distance from the trace, the object is moved along the trace on the screen.

In the above-described related art, a trace can be input within only the display range of the screen including the object, but it is impossible to instruct the object to move to the outside the display range. Thus, a trace input allowable range is limited to a display range, so that a movable range with one trace input is narrow. For example, if the object wants to be moved far, the trace input is repeatedly performed, resulting in inconvenience.

SUMMARY

Therefore, it is one aspect of example embodiments of the present invention to provide a novel storage medium storing an object movement controlling program and information processing apparatus.

Another aspect of example embodiments of the present invention is to provide a storage medium storing an object movement controlling program and an information processing apparatus which are able to move an object along an input trace in a wider range.

Example embodiments of the present invention employ a following configuration in order to solve the above-described problems. It should be noted that reference numerals and supplement inside the parentheses show one example of a corresponding relationship with the embodiments described later for easy understanding of example embodiments of the present invention, and do not limit the present invention.

A storage medium storing an object movement controlling program of a first aspect of example embodiments of the present invention is a storage medium storing an object movement controlling program of an information processing apparatus which displays on a display means an object moving in response to an input by an input means. The object movement controlling program of the storage medium causes a processor of the information processing apparatus to execute a display controlling step, a detecting step, a trace obtaining step, a movement controlling step, and a movement displaying step.

The display controlling step displays on the display means a first screen showing a first area in the virtual space and a second screen showing a second area in the virtual space wider than the first area simultaneously or through change. The detecting step detects coordinates input by the input means to the second screen displayed on the display means. The trace obtaining step stores in a storing means an input trace indicated by the coordinates successively detected by the detecting step. The movement controlling step moves the object along the coordinates in the virtual space corresponding to the input trace stored by the trace obtaining step. The movement displaying step displays on the first screen movement of the object by the movement controlling step.

More specifically, an object movement controlling program of the storing medium causes a processor (42) of an information processing apparatus (10: reference number corresponding in an embodiment described later) to execute each steps to be described below, and displays on a display means (14) an object (72) moving in a virtual space in response to an input by an input means (22). The display controlling step (S7, S33, S37) displays on the display means a first screen showing a first area in the virtual space and a second screen showing a second area in the virtual space wider than the first area simultaneously or through change. In the embodiment to be described later, the virtual space is a three-dimensional game world. As a first screen, a three-dimensional game screen is displayed, and as a second screen, a two-dimensional map screen showing a plane map of the virtual space is displayed. The display controlling step displays a second screen, and controls a movement of the object on the basis of an input to the second screen showing a wider range. That is, the detecting step (S15) detects coordinates input to the second screen displayed on the display means. The trace obtaining step (S25) stores in the storing means (48, 104) an input trace indicated by the successively detected coordinates. The movement controlling step (S35, S81) moves the object along the coordinates in the virtual space corresponding to the input trace. The movement displaying step (S35, S87) displays movement of the object on the first screen. An input trace input to the second screen showing the second area with a wider range in the virtual space is obtained. Then, an object moving along the input trace is displayed on the first screen showing a first area with a range narrower than the second area. Thus, an input trace for moving an object can be obtained from a wider range, and can move the object in a wider range.

In one embodiment, the movement controlling step includes a coordinates transforming step for transforming the input trace stored by the trace obtaining step to the coordinates in the virtual space.

More specifically, the coordinates transforming step (S21, S79) transforms the input trace into the coordinates in the virtual space, and the movement controlling step moves the object along the transformed coordinates. Thus, if coordinates transformation has to be made between the coordinates to be detected and the coordinates in the virtual space, the input trace can be transformed to the coordinates in the virtual space.

In another embodiment, the virtual space is a virtual three-dimensional space, and the coordinates transforming step transforms the input trace into three-dimensional coordinates in the virtual three-dimensional space on the basis of two-dimensional coordinates of the input trace stored by the trace obtaining step and map data of the virtual three-dimensional space stored in the storing means in advance.

More specifically, the object moves in the virtual three-dimensional space. In such a case, the coordinates transforming step transforms the input trace into three-dimensional coordinates in the virtual three-dimensional space on the basis of two-dimensional coordinates of the input trace and map data of the virtual three-dimensional space stored in the storing means (28a, 48, 96) in advance. Thus, the input trace to be detected as a two-dimensional coordinates can be transformed to the three-dimensional coordinates in the virtual three-dimensional space, and therefore, it is possible to move the object in the virtual three-dimensional space along the input trace.

In another embodiment, the movement displaying step generates the first screen on the basis of a center of interest moved according to the movement of the object by the movement controlling step.

That is, since the center of interest is moved according to the movement of the object (S83), it is possible to display the object moved according to the input trace on the first screen.

In the other embodiment, the display controlling step represents the virtual space in a three-dimensional manner as the first screen, and represents the virtual space in a two dimensional manner as the second screen.

More specifically, a virtual screen represented in a two-dimensional manner is displayed as a second screen. In the embodiment described later, the plane map of the virtual space is displayed, and a trace input is performed on the map screen. Thus, an input trace can be obtained from the second screen on which information of a wider range of the virtual space is simply represented in a two-dimensional manner, allowing the user to perform an input of the trace easily. Then, a movement of the object is displayed on the first screen representing the virtual space in a three-dimensional manner, and therefore, it is possible to display a scene of the movement of the object in detail.

In another embodiment, the input means includes a touch panel provided on the display screen of the display means. The trace obtaining step stores as the input trace coordinates successively detected by the detecting step since an input state to the touch panel has come. The movement controlling step starts to move the object when a no-input state to the touch panel has come.

More specifically, the input means includes a touch panel on the display screen. The trace obtaining step starts obtaining the input coordinates when an input to the touch panel is started (S9), and stores as the input trace coordinates successively detected since the touch-on was detected. The movement controlling step starts to move the object when the input to the touch panel is finished (S29). Accordingly, a series of input operations such as starting a touch input on the touch panel on the second screen, obtaining a trace by a continuous input, and ending the touch input is performed, and whereby, it is possible to control the movement of the object simply and intuitively.

In addition, in another embodiment, the trace obtaining step, when the number of coordinates as the input trace exceeds a fixed value, does not store as the input trace the coordinates to be detected from that time by the detecting step.

That is, when the number of coordinates stored as an input trace exceeds a fixed value (S13), the coordinates to be detected from that time are not stored as an input trace, capable of imposing restrictions on a movable distance of an object.

Furthermore, in another embodiment, the trace obtaining step, when the coordinates to be detected by the detecting step is moved by a fixed distance or more from the previously stored coordinates as the input trace, stores the detected coordinates as the input trace.

That is, when the detected coordinates is moved by a fixed distance or more from the previously stored coordinates as the input trace (S19), the detected coordinates is stored as the input trace, capable of eliminating the coordinates detected due to the hand shaking from the input trace.

Also, in another embodiment with a touch panel, an information processing apparatus further includes an operating switch. The movement controlling step stops moving the object when a predetermined instruction based on the operation data from the operating switch is detected before a no-input state to the touch panel has come.

More specifically, the information processing apparatus further includes an operating switch (20). When operation data indicative of a predetermined instruction is detected before a touch-off operation is detected, that is, before a start of movement of the object is instructed (S31), a movement controlling step stops moving the object. Thus, it is possible to cancel the movement of the object on the basis of the input trace which has been input at that time by performing a predetermined operation with the operating switch.

An information processing apparatus of a second aspect of example embodiments of the present invention is an information processing apparatus which displays on a display means an object moving in response to an input by an input means in a virtual space. The information processing apparatus comprises a display controlling means, a detecting means, a trace obtaining means, a movement controlling means, and a movement displaying means. The display controlling means displays on the display means a first screen showing a first area in the virtual space and a second screen showing a second area in the virtual space wider than the first area simultaneously or through change. The detecting means detects coordinates input by the input means to the second screen displayed on the display means. The trace obtaining means stores in a storing means an input trace indicated by the coordinates successively detected by the detecting means. The movement controlling means moves the object along the coordinates in the virtual space corresponding to the input trace stored by the trace obtaining means. The movement displaying means displays on the first screen movement of the object by the movement controlling means.

The second aspect is an information processing apparatus corresponding to the storage medium storing an object movement controlling program according to the above-described first aspect. In the second aspect also, similarly to the above-described first aspect, it is possible to move an object along the input trace in a wider range.

According to example embodiments of the present invention, a trace input to the second screen displaying a second area wider than the first area in the virtual space is obtained, the object is moved along the trace, and the movement of the object is displayed on the first screen showing the first area. Thus, since an input trace can be obtained from a screen showing a wider range, the object can be moved along the input trace in a wider range.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 12 is an illustrative view showing one example of contents of the input trace data;

DETAILED DESCRIPTION OF THE
NON-LIMITING EXAMPLE EMBODIMENTS

Figure 1:
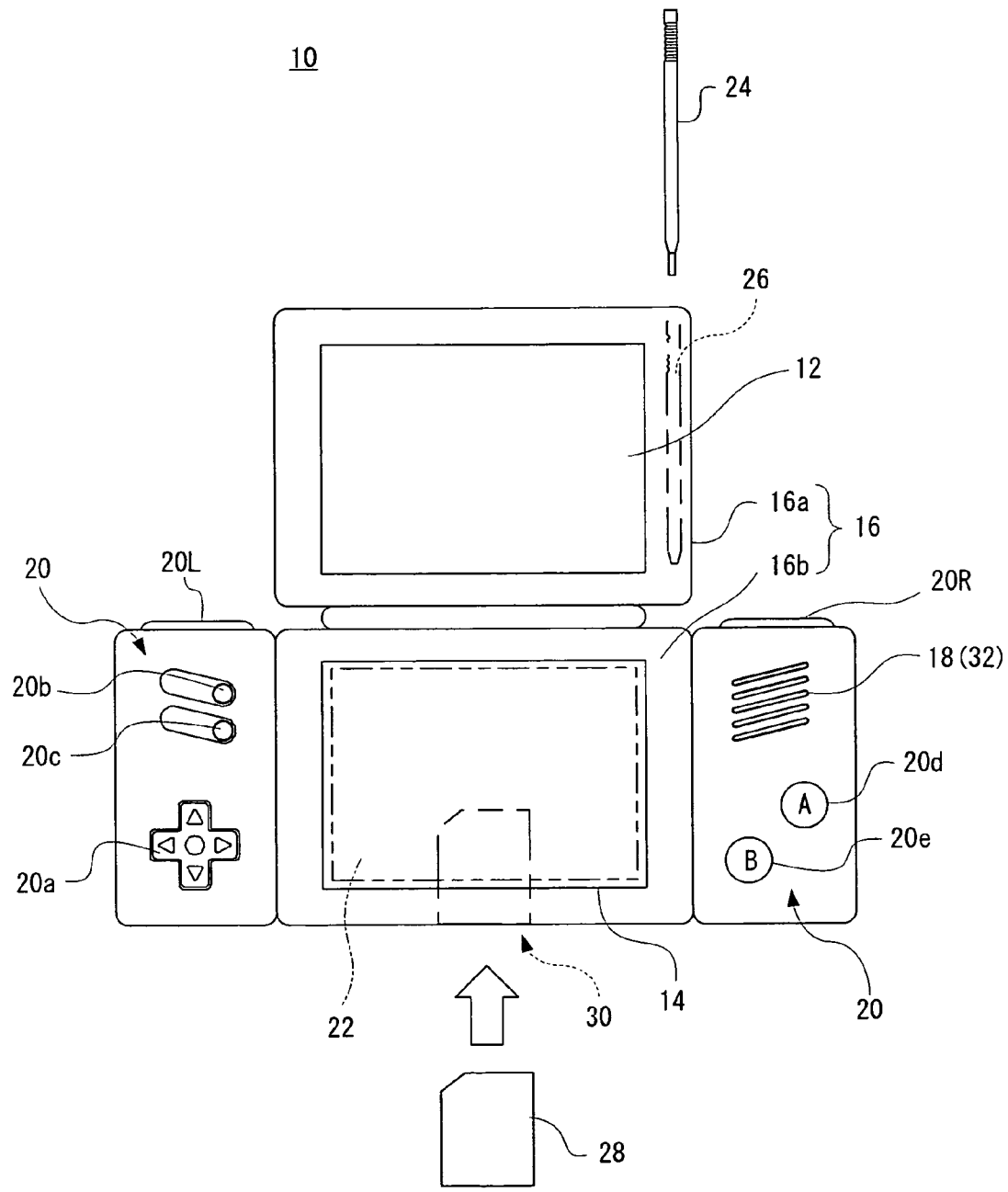
FIG. 1 is an appearance view showing one example of an information processing apparatus of one example embodiment of the present invention.

With referring to FIG. 1, an information processing apparatus 10 of example embodiments of the present invention is realized in a game apparatus as one example. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch or operating key 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

The direction instructing switch (direction key) 20a functions as a digital joystick, and is utilized for instructing a moving direction of an object to be operated. By operating any one of four depression portions, a player character (or player object) to be operated by a player (user) and a cursor, etc can be moved in a corresponding direction.

The start switch 20b is formed by a push button, and is utilized for starting a game (restarting), temporarily stopping a game, and so forth. The select switch 20c is formed by the push button, and utilized for a game mode selection, etc.

The action switch (action key) 20d, that is, the A button is formed by the push button, and is utilized for instructing an action except for movement direction. For example, this allows the player character to perform an arbitrary movement (action) such as hitting (punching), throwing, holding (obtaining), riding, jumping, cutting etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. Also, at a time of selecting a menu screen, a menu item on which a cursor is displayed, that is, which is in a selecting state is determined to execute an operation or processing corresponding to the item.

The action switch 20e, that is, the B button is formed by the push button, and is utilized for changing a game mode selected by the select switch 20c, canceling an action determined by the A button 20d, and so forth. The B button 20e can also be utilized as an operation key for instructing a movement of the player character similarly to the A button 20d.

The action switch 20L (L button) and the action switch 20R (R button) are formed by the push button, and the L button 20L and the R button 20R can perform the same operation as or the different operation from the A button 20d and the B button 20e, and also function as a subsidiary of the A button 20d and the B button 20e. It should be noted that the above-described push button may be designed so as to work when the keytop thereof is depressed. Thus, with a simple operation such as depressing each of the switches, it is possible to make an operation instruction, etc.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, hitting, and so forth with a stick 24, a pen (stylus pen), or a finger (hereinafter, referred to as "stick 24, etc.") on a top surface of the touch panel 22, the touch panel 22 detects a coordinates in the position instructed (that is, touched) by the stick 24, etc. to output coordinates data corresponding to the detected coordinates.

It should be noted that in this embodiment, a resolution of the display surface of the LCD 14 is 256 dots×192 dots, and a detection accuracy of a detection surface (operation surface) of the touch panel 22 is also rendered 256 dots×192 dots in correspondence to the resolution of the display surface (this is true for the LCD 12). However, in FIG. 1, fort the sake of simply illustration of the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it in another embodiment.

A display screen of different game screens can be displayed on the LCD 12 and the LCD 14. Furthermore, by utilizing the two display areas (LCD 12 and LCD 14) as one screen, it is possible to display a large monster (enemy character) to be defeated by the player character. Accordingly, the player is able to point an object image such as a player character, an enemy character, an item object, texture information, an icon, etc. to be displayed on the LCD 14, select commands, input coordinates, and so forth by operating the touch panel 22 with the use of the stick 24, etc.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens or two display areas (12, 14) and the operating portions (20, 22) of two systems.

Furthermore, in this embodiment, the stick 24 can be inserted into a housing portion (slot or concave) 26 provided in proximity to a side surface (right side surface) of the upper housing 16a, for example, and taken out therefrom as necessary. It should be noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
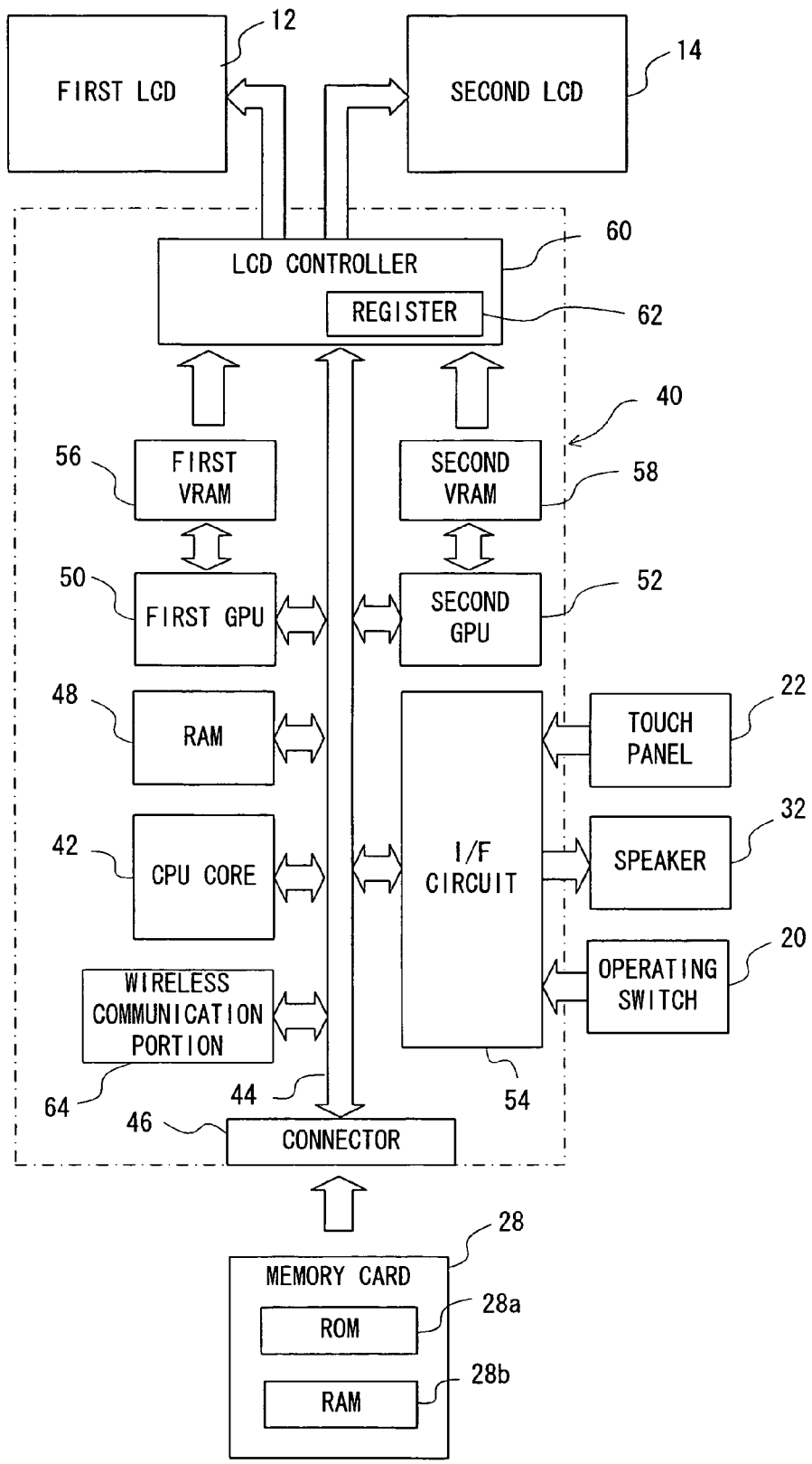
FIG. 2 is a block diagram showing an electric configuration of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "IN circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, object image, background image, item image, icon (button) image, message image, cursor image etc.), data of the sound (music) necessary for the game (sound data), etc. The game program includes an object movement control program according to example embodiments of the present invention. The RAM (backup RAM) 28b stores (saves) proceeding data and result data of the game.

Also, if an application except for the game is executed, a program as to the application, image data necessary for executing the application, etc. are stored in the ROM 28a of the memory card 28. Furthermore, sound (music) data may be stored as necessary.

The RAM 48 is utilized as a buffer memory or a working memory. That is, the CPU core 42 loads the program, the image data, the sound data, etc. stored in the ROM 28a of the memory card 28 into the RAM 48, and executes the process according to the loaded program. The CPU core 42 executes the process while storing data (game data, flag data, etc.) generated or obtained in correspondence with a progress of the game in the RAM 48.

It should be noted that the program, the image data, the sound data, etc. are read from the ROM 28a entirely at a time, or partially and sequentially as necessary so as to be stored into the RAM 48. It should be noted that as in this embodiment, if the game apparatus 10 is one which is able to directly connect the storing medium fixedly storing a program and data to the CPU core 42, the CPU core 42 can directly access the storing medium, eliminating a need of transferring and holding the program and the data in the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. It should be noted that the CPU core 42 applies an image generation program (included in the game program) to both of the CPU 50 and GPU 52.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. It should be noted that the CPU core 42 reads image data necessary for rendering from the RAM 48, and writes it to the first VRAM 56 and the second VRAM 58 via the VRAM 56 and the VRAM 58. The GPU 50 accesses the VRAM 56 to generate game image data for display, and stores the image data in a rendering buffer in the VRAM 56. The GPU 52 accesses the VRAM 58 to create game image data for rendering, and stores the image data in a rendering buffer of the VRAM 58. A flame buffer or a line buffer may be employed as the rendering buffer.

The VRAM 56 and the VRAM 58 are connected to the LCD controller 60. The LCD controller 60 includes a register 62, and the register 62 comprises, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It should be noted that the LCD controller 60 can directly read the game image data from the VRAM 56 and the VRAM 58, or read the game image data from the VRAM 56 and the VRAM 58 via the GPU 50 and the GPU 52.

Also, the VRAM 56 and the VRAM 58 may be provided in the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

The wireless communication portion 64 is a communication means for wirelessly sending and receiving data with other game apparatuses 10. The wireless communication portion 64 modulates communication data to be transmitted to the opponent into a wireless signal to send it from an antenna, and receives a wireless signal from the opponent by the same antenna to demodulate it to communication data.

In this embodiment, a virtual game world (virtual game space) where an object exists is rendered or represented in different display scales to display at least two display screens having different display ranges. An input trace input by utilizing the touch panel 22 to a small-scale screen, that is, screen with a wider display range is obtained, and the object is moved according to the trace on a large-scale screen, that is, a screen with a narrower display range.

It should be noted that in this embodiment, a description is made on a case where a game is executed in the game apparatus 10, and an application to be executed in the information processing apparatus 10 according to example embodiments of the present invention may not be limited to a game. That is, example embodiments of the present invention can be applied to various applications in which an object is moved according to an input trace in the virtual space.

Figure 3:
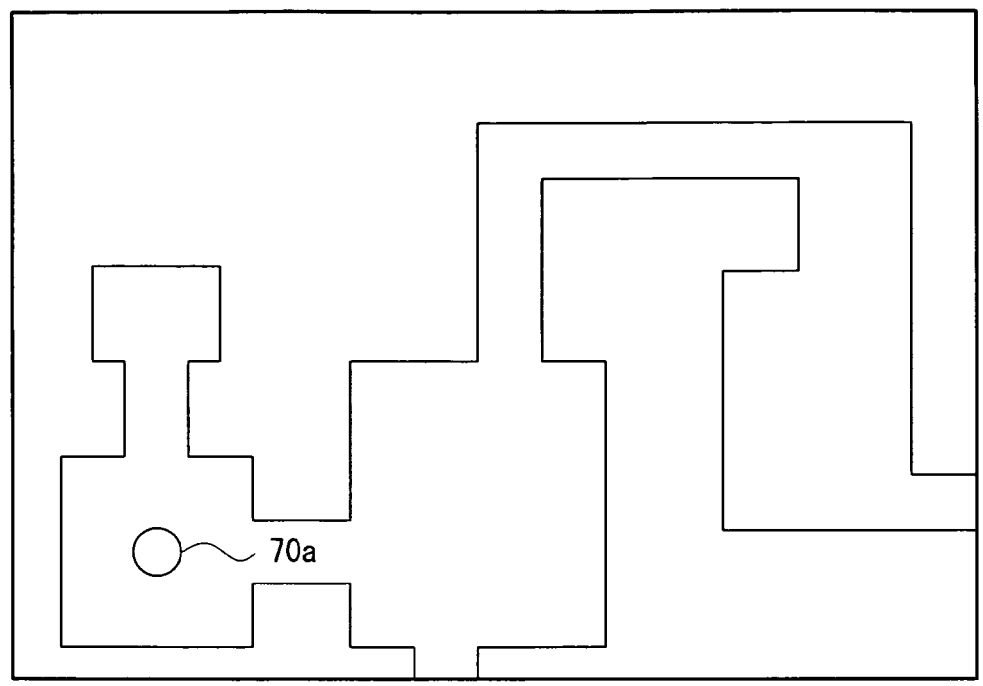
FIG. 3 is an illustrative view showing an initial screen in which a three-dimensional image including a player character is displayed on a lower screen and a two-dimensional plane map image is displayed an upper screen.
Figure 3:
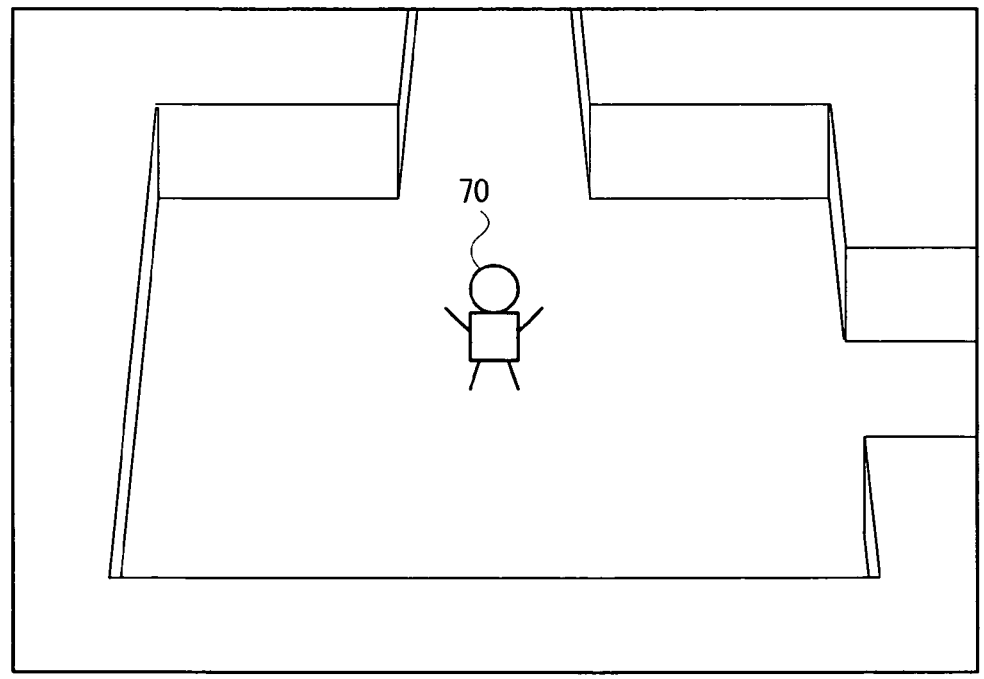

More specifically, FIG. 3 shows an initial screen before an object is moved according to an input trace. As can be understood from a lower screen in FIG. 3, the virtual game world in this embodiment is three dimensional. On the lower screen displayed on the LCD 14, a first area including an existing position of the player character 70 out of the entire virtual three-dimensional game space is displayed. The image displayed on the lower screen is a three-dimensional image obtained by rendering a virtual three-dimensional game space with a three-dimensional computer graphics. That is, this image is an image rendered so as to give the virtual three-dimensional game world a three-dimensional appearance. For example, the coordinates of the center of interest of the virtual camera is set to the coordinates of the player character 70 in the virtual three-dimensional game space such that the player character 70 is displayed at the center of the screen. Furthermore, the position of the virtual camera is set to a position higher than that of the player character 70 such that it looks down on the player character 70 and the game space around it. A first area to be displayed on the three-dimensional game screen is set to a relatively narrower area in order to illustrate surrounding circumstances of the player character 70, such as a land, an enemy character (not shown), etc. simply and in detail, or precisely move the player character 70. The three-dimensional game screen becomes a main screen to be often used in order to operate various operations while being viewed by the player during a game play.

On the other hand, on the upper screen to be displayed on the LCD 12, a map screen of the virtual three-dimensional game space is displayed. The map screen represents information such as an entire or wide range of land and course of the virtual game space. The map screen is a two-dimensional image representing a two-dimensional plane map which is obtained by viewing a virtual three-dimensional game space from a directly above. That is, this is a plane image being free from information in a depth direction and in a height direction. The range to be displayed on the map screen may be an entire game space or a part of the game space. It should be noted that the map screen displays a range wider than that of the three-dimensional game screen of the main screen which is being played so as to provide information on a wider range of the game space. On the map screen, the player character 70 is displayed by a symbol image 70*a*, and the symbol 70*a* indicates an existing position of the player character 70 in the game space.

The player character 70 can be equipped with an item, and an object of a movement control of the input trace is an item object 72 rather than the player character 70. It should be noted that the item object 72 is not displayed in FIG. 3, but displayed only when it starts to move (see FIG. 6). If the kind of item object 72 equipped by the player character 70 is a type operable by a trace input, it becomes useable by moving the item object 72. In addition, in this embodiment, an explicit operation by the player becomes a condition for moving and using the item object 72. That is, operating the item utilizing button (L button 20L, for example) is a necessary condition. It should be noted that in another embodiment, the condition may be a condition which become automatically (without a specific operation for use) available in correspondence to the progress of the game. For example, the player character 70 exists in a predetermined positional relationship to another object in the game space, a property or a status such as the level and the life of the player character 70 becomes a predetermined value.

Figure 4:
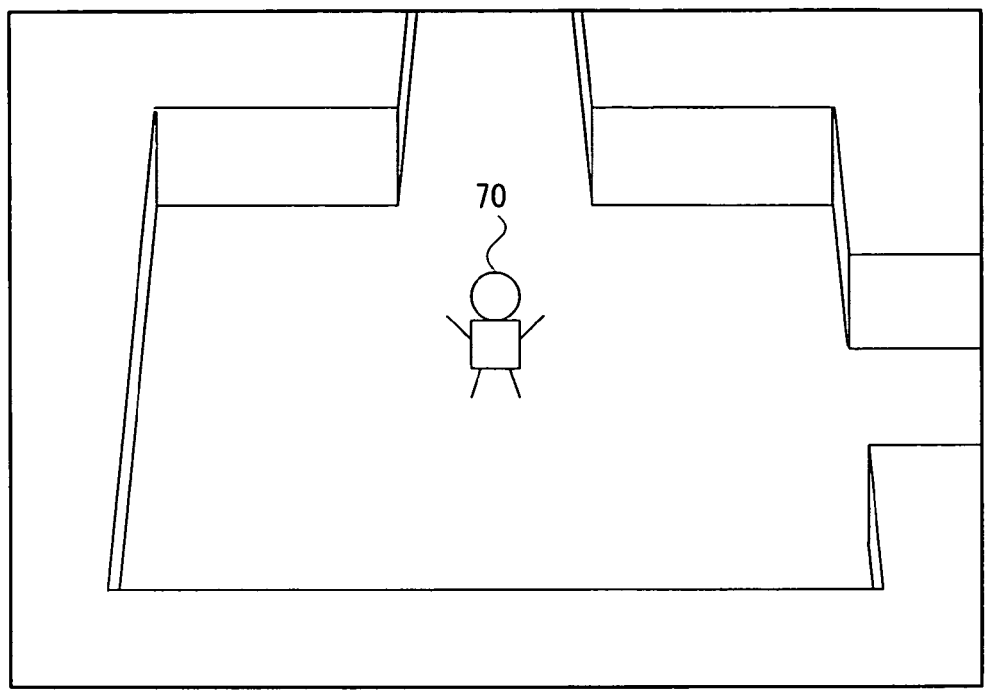
FIG. 4 is an illustrative view showing one example of a screen in a case that a upper screen on which a three-dimensional image including a player character is displayed and an lower screen on which a two-dimensional plane map image is displayed in response to the item being useable.
Figure 4:
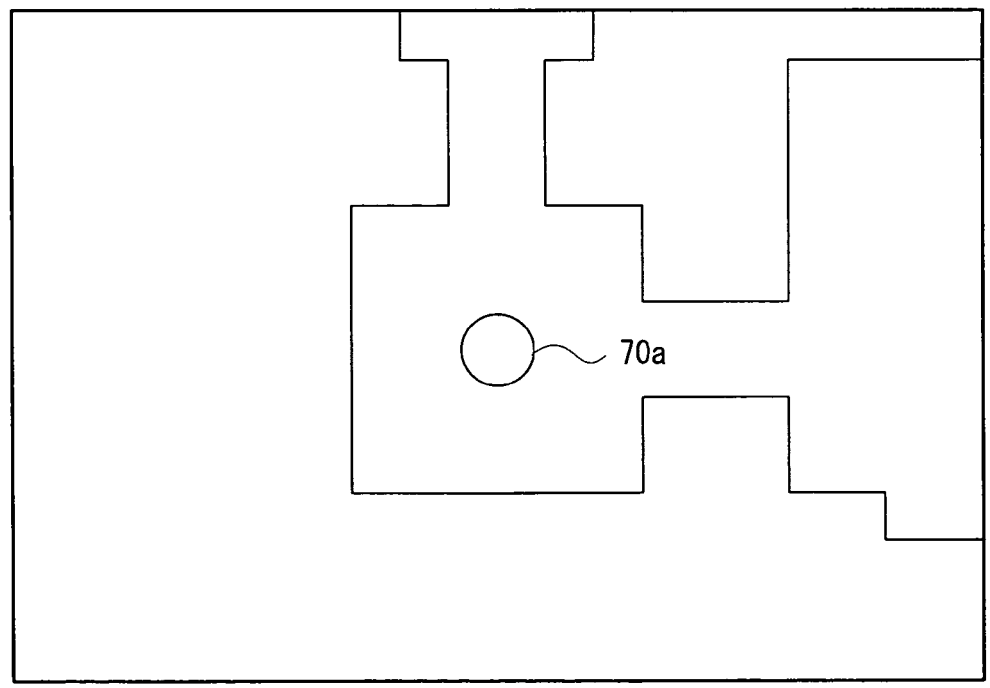

In this embodiment, when the equipped item is a kind allowing a tracing operation, and the L button 20L is operated, the display screen is switched. That is, as shown in FIG. 4, the three-dimensional game screen which has been displayed on the lower screen until that time is displayed on the upper screen, and a two-dimensional map screen is displayed on the lower screen on which a tracing input can be performed by utilizing the touch panel 22. Since the two-dimensional map screen representing the second area wider than the first area represented by the three-dimensional game screen is displayed on the lower screen on which the touch panel 22 is set, the player can perform an operation (tracing input) for instructing the movement of the item object 72 in a wider range of the virtual game space. Thus, it becomes possible to move the item object 72 in a wider range along the input trace.

It should be noted that in this embodiment, the coordinates of the display range of the map screen shown in FIG. 4 and the coordinates of the game space in the virtual three-dimensional game space are associated at a ratio of one to ten, for example. Since the display range is set such that the center of the map screen is coincident with the position of the symbol 70a of the player character 70, the player can simply start a trace input operation from the center of the game screen without searching the position of the symbol 70a of the player character 70 on the map screen after switching the screen.

In this embodiment, the display range of the map screen in FIG. 4 is set so as to become narrower than the display range of the map screen in FIG. 3 (at a ratio of two to three, for example), and therefore, the surroundings of the player character 70 is displayed in a more enlarged manner than the map screen in FIG. 3. Making the display range of the map screen at a time of being input narrower allows the player to precisely input the trace. Also, a movable range of the item object 72 can be limited to the predetermined range (noted that a range wider than the main three-dimensional game screen) rather than the entire game world. It should be noted that in another embodiment, at a time of switching the screen, the map screen in FIG. 3 may directly be displayed, or a map screen on which the position of the player character 70 is set to be the center of the screen may be displayed in the same scale as the map screen in FIG. 3.

Figure 5:
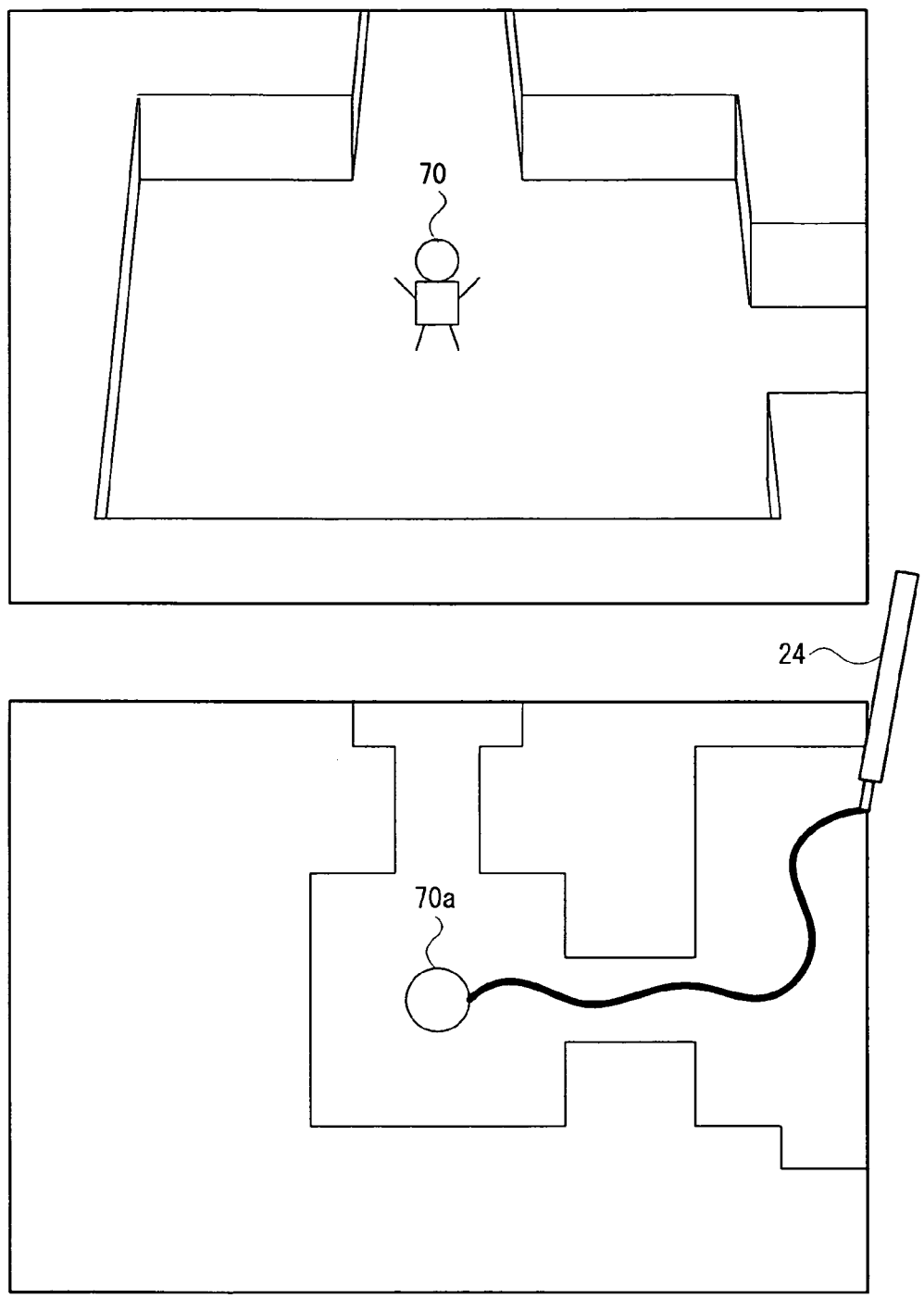
FIG. 5 is an illustrative view showing one example of a screen in a case that a trace is input in response to a successive touch input on the lower screen from a touch-on operation.

Successively, as shown in FIG. 5, the player continuously performs a touch operation on the two-dimensional map image, that is, touch panel 22 displayed on the lower screen in FIG. 4 by the stick 24, etc. to thereby input a trace for moving the item object 72. The obtainment (storing) of the input trace is started when a touch input is started, that is, when it is detected that a touch-off state (no input state to the touch panel 22) is shifted to a touch-on state (input state to the touch panel 22) in this embodiment. The player can input a trace by moving a touch position in a touch-on state. Since a dot image is rendered at a display position corresponding to the obtained coordinates in the two-dimensional map image, the touch position is slid to make each of the dots continuous, and whereby, an input trace is rendered.

Thus, an input trace can be obtained from the second screen on which information of a wider range of the virtual space is simply represented in a two-dimensional manner, allowing the player to easily perform an input operation of the trace in a wider range.

It should be noted that in a case that the turn-off of the operation of the item utilizing button 20L is detected while touch-on is continued, the input trace which has been obtained until then is canceled, and the rendered trace is also erased from the two-dimensional screen.

In this embodiment, by detecting the touch-off operation, the obtainment of the input trace is ended. That is, by the continuous touch input from the touch-on to the touch-off, it is possible to input a trace for moving the item object 72.

It should be noted that in this embodiment, the number of the coordinates capable of being stored as an input trace is limited. That is, if it is determined that the number of coordinates stored as an input trace exceeds a fixed value (100, for example), even if the touch-on state is continued, the detected coordinates is not stored as an input trace. The limit value of the number of coordinates may be set to a different value depending on properties such as a kind, ability of the item object 72 and properties, etc. of the player character 70. The number of coordinates to be stored may eventually impose a limit on a movable distance of the item object 72. It should be noted that after the number of coordinates exceeds the threshold value, even if the touch input is continued, the trace is not rendered on the map screen any more. This can informs the player of the number of input allowable coordinates being exceeded.

In addition, in this embodiment, if it is determined that the distance between the coordinates previously stored as an input trace and the detected coordinates does not exceed a fixed distance, the detected coordinates is not stored as an input trace. That is, if the trace is not moved by a fixed distance or more from the previously stored coordinates, it is not regarded as an input trace. Thus, it is possible to eliminate the coordinates detected due to hand shaking from the coordinates of the input trace, capable of properly obtaining the input trace intended by the player.

If it is determined that the touch-on state shifts to the touch-off state, the movement of the item object 72 according to the input trace is started. That is, in this embodiment, a touch-off operation is a condition of the end of the input trace obtainment, and is also a condition of causing the item object 72 to move. Thus, a series of input operations such as starting a touch input on the touch panel 22 (touch-on), inputting a trace by a continuous input, and ending a touch input (touch-off) is performed, and whereby, it is possible for the player to control the movement of the item object 72 simply and intuitively.

It should be noted that in another embodiment, an operation of a predetermined operating switch 20 (except for the item utilizing button 20L) after the touch-off operation, for example, may be set as a condition for moving the item object 72. Also, an operation of the predetermined operating switch 20 is detected while the touch-on is continued, for example, may be a condition for moving the item object 72, and in this case, when an operation of the predetermined operating switch 20 is detected, the obtainment of the input trace is ended.

Figure 6:
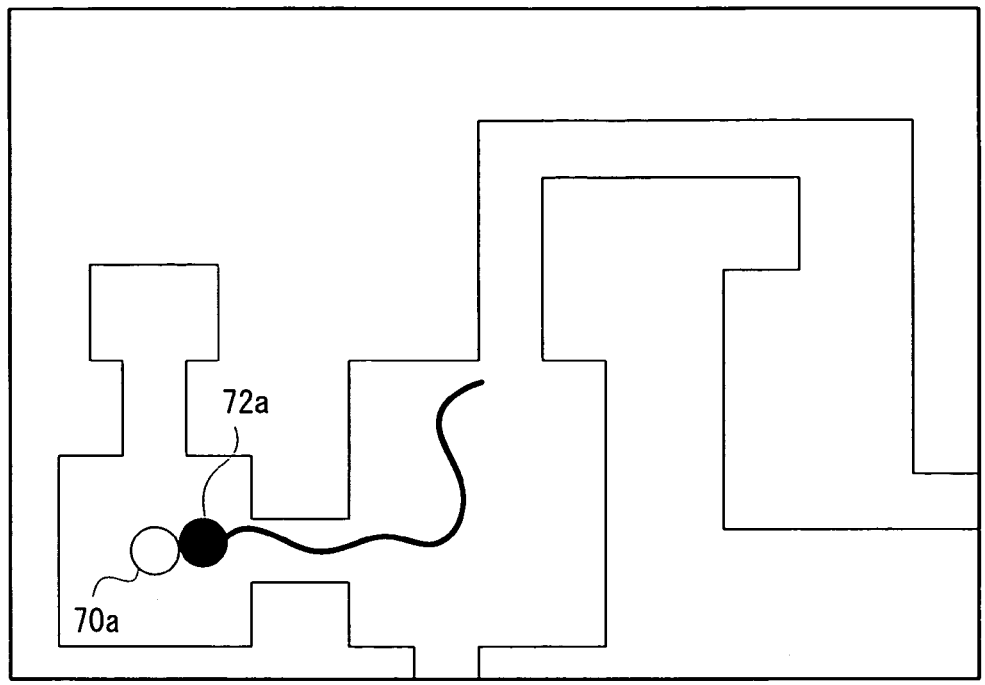
FIG. 6 is an illustrative view showing one example of a screen in a case that the display screen is switched according to the touch-off operation after FIG. 5 to display a two-dimensional plane map image on the upper screen and a three-dimensional image including an item on the lower screen.
Figure 6:
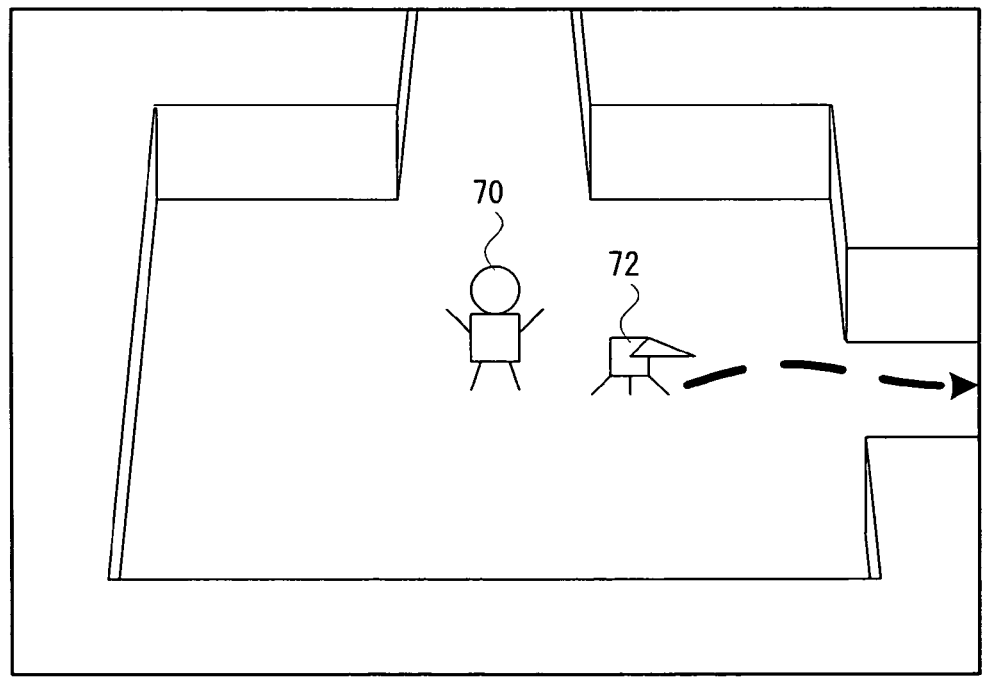

If the touch-off is detected, the display screen is switched again before the movement of the item object 72 is displayed. That is, as shown in FIG. 6, a two-dimensional map screen is displayed on the upper screen, and a three-dimensional game screen is displayed on the lower screen. On the three-dimensional game screen, the item object 72 is displayed at a position adjacent to the player character 70. On the other hand, on the two-dimensional map screen, the symbol 72a of the item object 72 is displayed at a position adjacent to the symbol 70a of the player character 70.

It should be noted that the display range of the two-dimensional map screen of the upper screen is returned to the display range of the map screen in original FIG. 3, and a range wider than the map screen when the trace input is performed in FIG. 5 is displayed. Also, the predetermined position rather than the position of the symbol 70*a* of the player character 70 is set to the center of the screen. Also, on the map screen, the input trace is displayed to thereby represent a route where the item object 72 is to be moved. It should be noted that arrow shown by dashed lines on the lower screen in FIG. 6 is for simply representing the path to be moved of the item object 72, and is not actually displayed on the screen.

Figure 7:
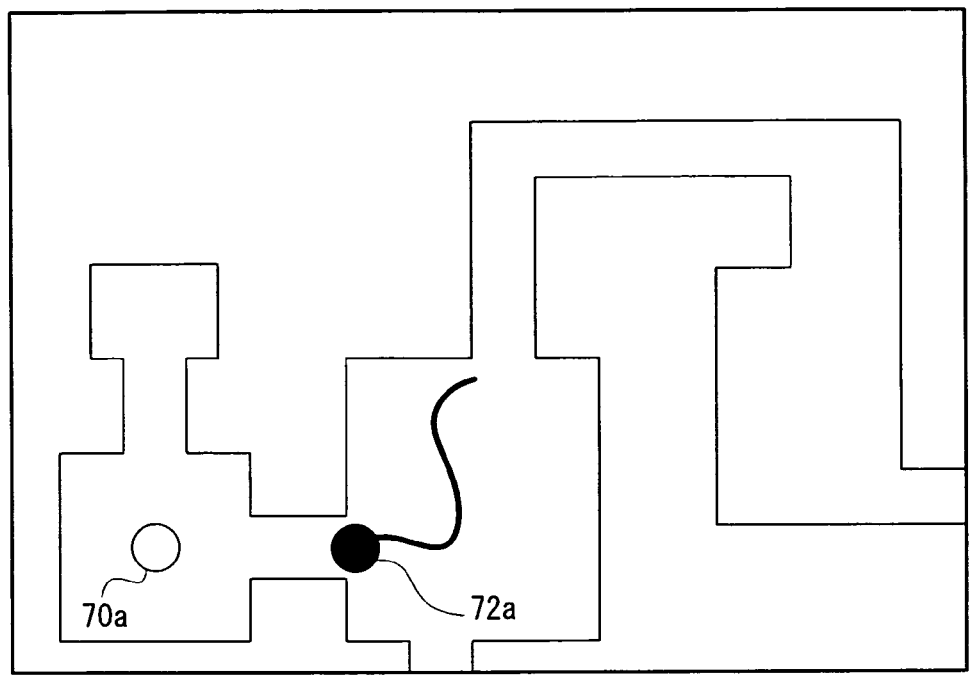
FIG. 7 is an illustrative view showing one example of a screen in a case that the item is moved along an input trace on the lower screen after FIG. 6, and a symbol is moved along the input trace on the upper screen.
Figure 7:
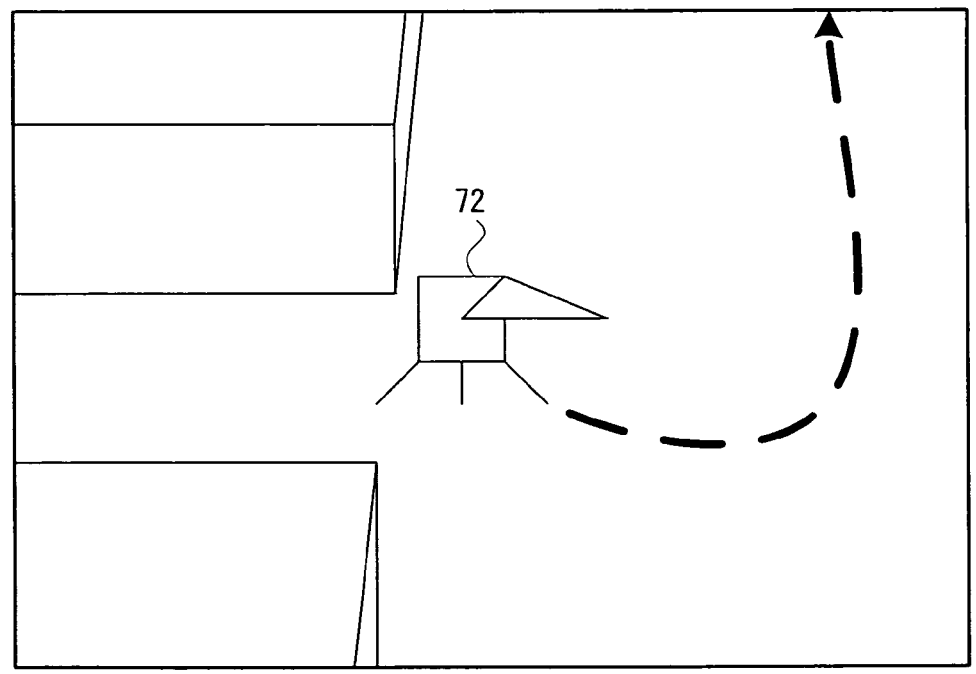

As shown in FIG. 7, a three-dimensional game screen in which the item object 72 moves along the input trace is displayed on the lower screen. Thus, on the three-dimensional game screen representing the virtual game world in a three-dimensional manner, the movement of the item object 72 is displayed, so that it is possible to display a moving scene of the item object 72 in detail.

The movement route of the item object 72 in the virtual three-dimensional space is calculated by performing a coordinates transformation from the input trace represented by the coordinates in the two-dimensional coordinates system on the map screen (display screen on the LCD 14, that is, operation surface of the touch panel 22) into the coordinates in the 3-dimensional coordinates system in the virtual three-dimensional space.

Figure 8:
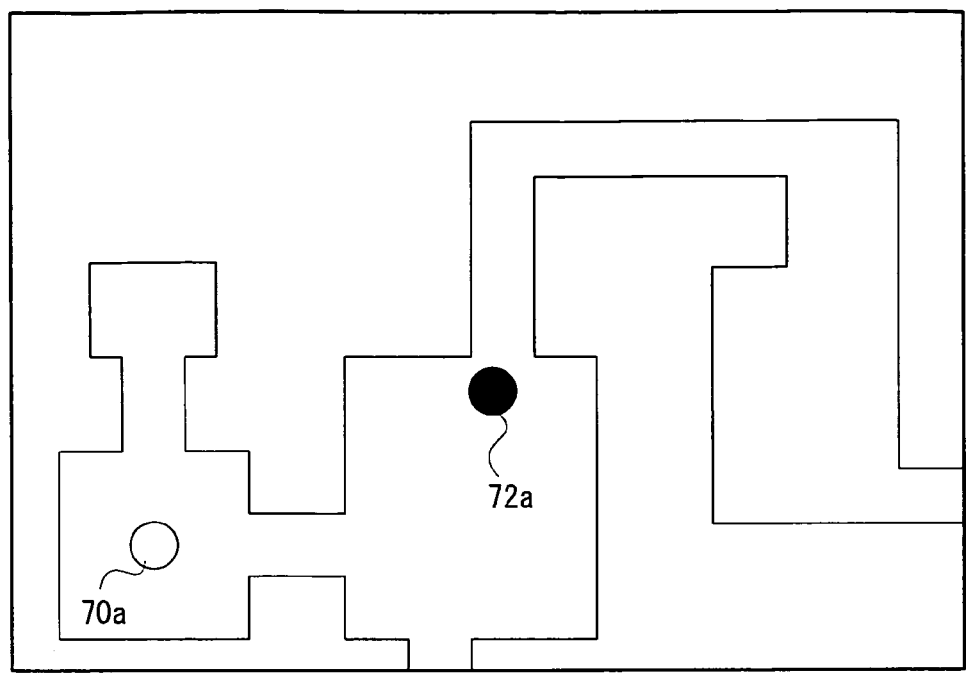
FIG. 8 is an illustrative view showing one example of a screen when movements of the item and the symbol are completed after FIG. 7.
Figure 8:
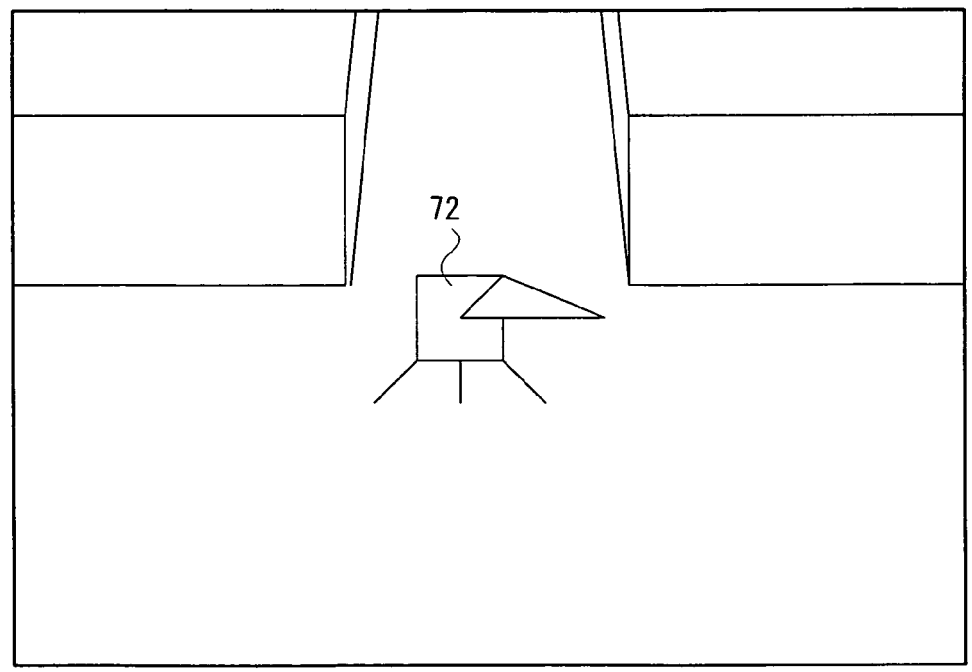

It should be noted that in the three-dimensional game screen in FIG. 7, the center of interest is set to the position of the item object 72. When the item object 72 moves according to the input trace, the center of interest and the camera position are also moved according to the movement. The camera position is set to a position nearer to the center of interest than that in FIG. 6. Thus, a detailed display can be made with the moving scene of the item object 72 constantly captured on the screen. According to the movement of the item object 72, the position of the symbol 72*a* is moved on the upper screen, and the input trace where the item object 72 has been moved out of the input trace displayed on the two-dimensional map screen is erased. It should be noted that the viewpoint of the two-dimensional map screen, that is, the display range is fixed, and not moved according to the movement of the item object 72. Thus, as shown in FIG. 8, each of the three-dimensional game screen and the two-dimensional map screen shows game screens in which the movement according to the input trace is performed until the item object 72 reaches the last coordinates of the input trace.

Figure 9:
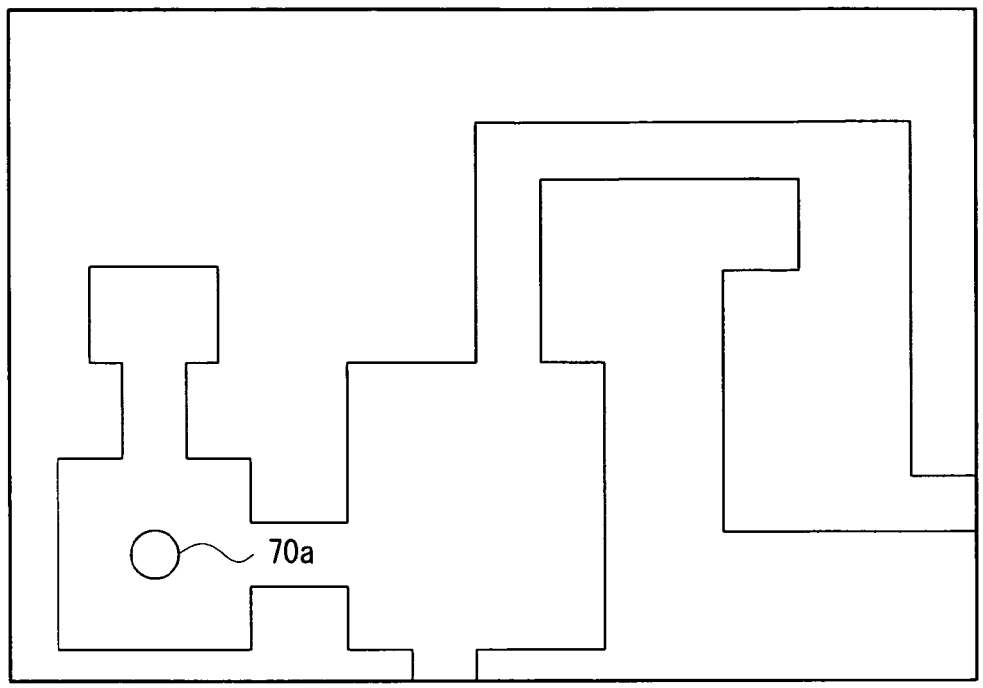
FIG. 9 is an illustrative view showing one example of a screen in a case that a center of interest on the lower screen is moved to the player character after FIG. 8.
Figure 9:
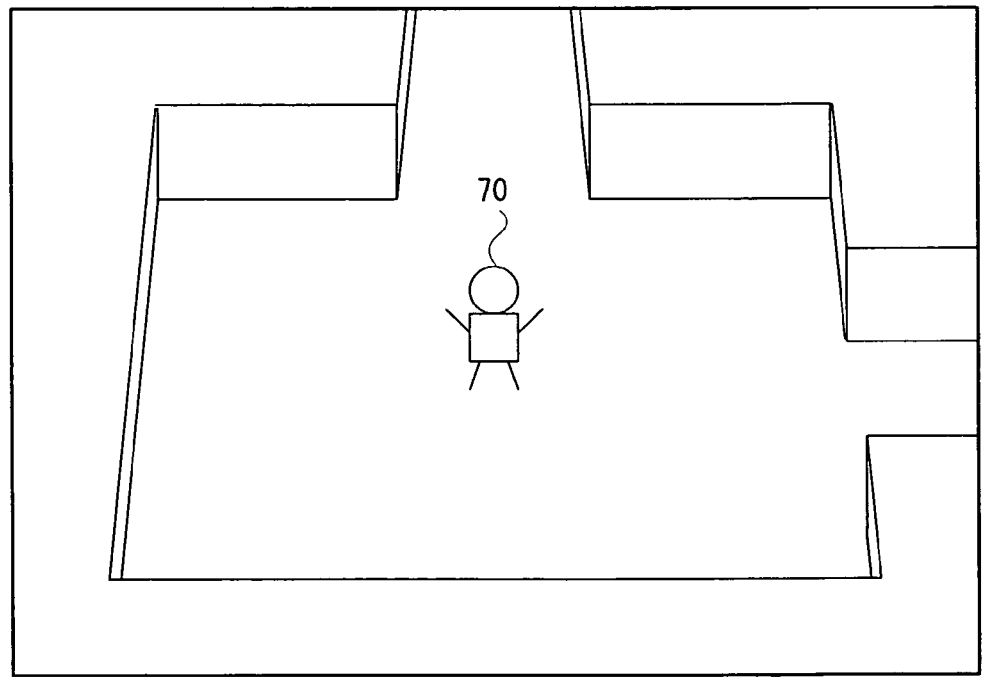

After completion of the movement of the item object 72 based on the input trace, as shown in FIG. 9, the three-dimensional game screen on the lower screen is generated in association with the player character 70. That is, for example, the center of interest is set to a position of the player character 70 again, and the camera position is also returned to the original position from the position nearer to the center of interest. Furthermore, in this embodiment, the item object 72 is, for example, an object capable of making an explosion after movement to affect the land of the surroundings, an enemy character, etc. and is erased after completion of movement so that the symbol 72*a* is also erased from the two-dimensional map screen of the upper screen.

Figure 10:
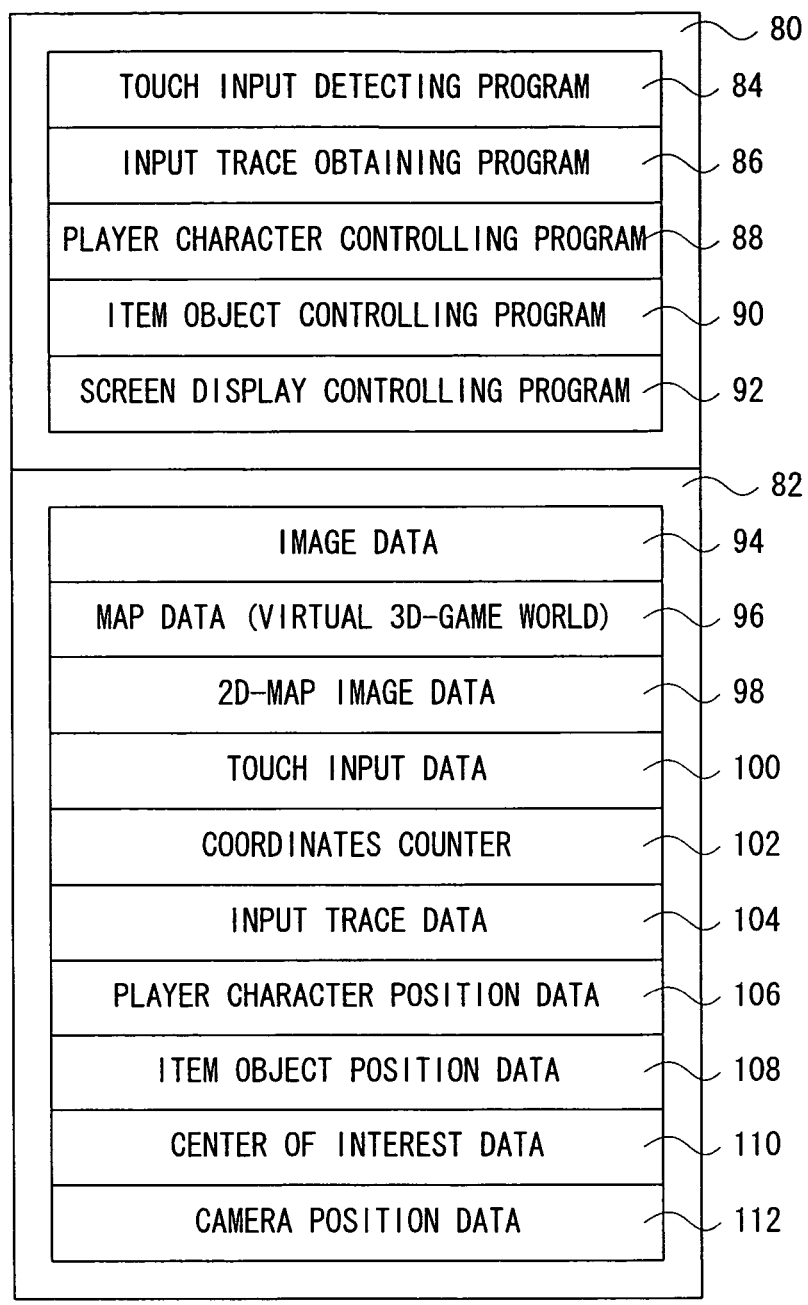
FIG. 10 is an illustrative view showing one example of a memory map of the information processing apparatus.

FIG. 10 shows one example of a memory map of the game apparatus 10. The memory map includes a program storage area 80 and a data storage area 82. It should be noted that FIG. 10 shows only the part of the memory map in which various programs and data necessary for progressing the game or the application are stored.

In the touch input detecting program storing area 84, a program for detecting operation data (touch input data) from the touch panel 22 is stored. The touch input data includes coordinates data of the touch position, and is detected at regular intervals (each display frame (1/60 seconds), for example).

In the input trace obtaining program storing area 86, a program for obtaining an input trace for moving the item object 72 is stored. In this embodiment, the coordinates which is successively detected from the touch-on to the touch-off are obtained as a coordinates of the input trace. It should be noted that an upper limit is set to the number of coordinates to be stored as an input trace as described above, and therefore, the stored number of the coordinates is counted by the coordinates counter, and if the coordinates counter value exceeds the predetermined threshold value, the detected coordinates and the following is not stored as an input trace. Also, as a measure of hand shaking, the coordinates to be detected which is not moved by a fixed distance or more from the previously stored coordinates is also not stored.

Also, in this embodiment, the virtual game world is three dimensional, and the main game screen is displayed by a three-dimensional image. Thus, in the three-dimensional virtual game world, it is necessary to move the item object 72 along the input trace, and generate a three-dimensional image representing the movement. However, the coordinates stored as an input trace is the two-dimensional coordinates on the operation surface of the touch panel 22, that is, the coordinates which is brought into correspondence with the two-dimensional coordinates system of the two-dimensional map displayed on the LCD 14. Accordingly, the input trace obtaining program performs a coordinate transformation on the input trace to calculate the trace of the 3-dimensional coordinates system in the virtual game world.

Figure 11:
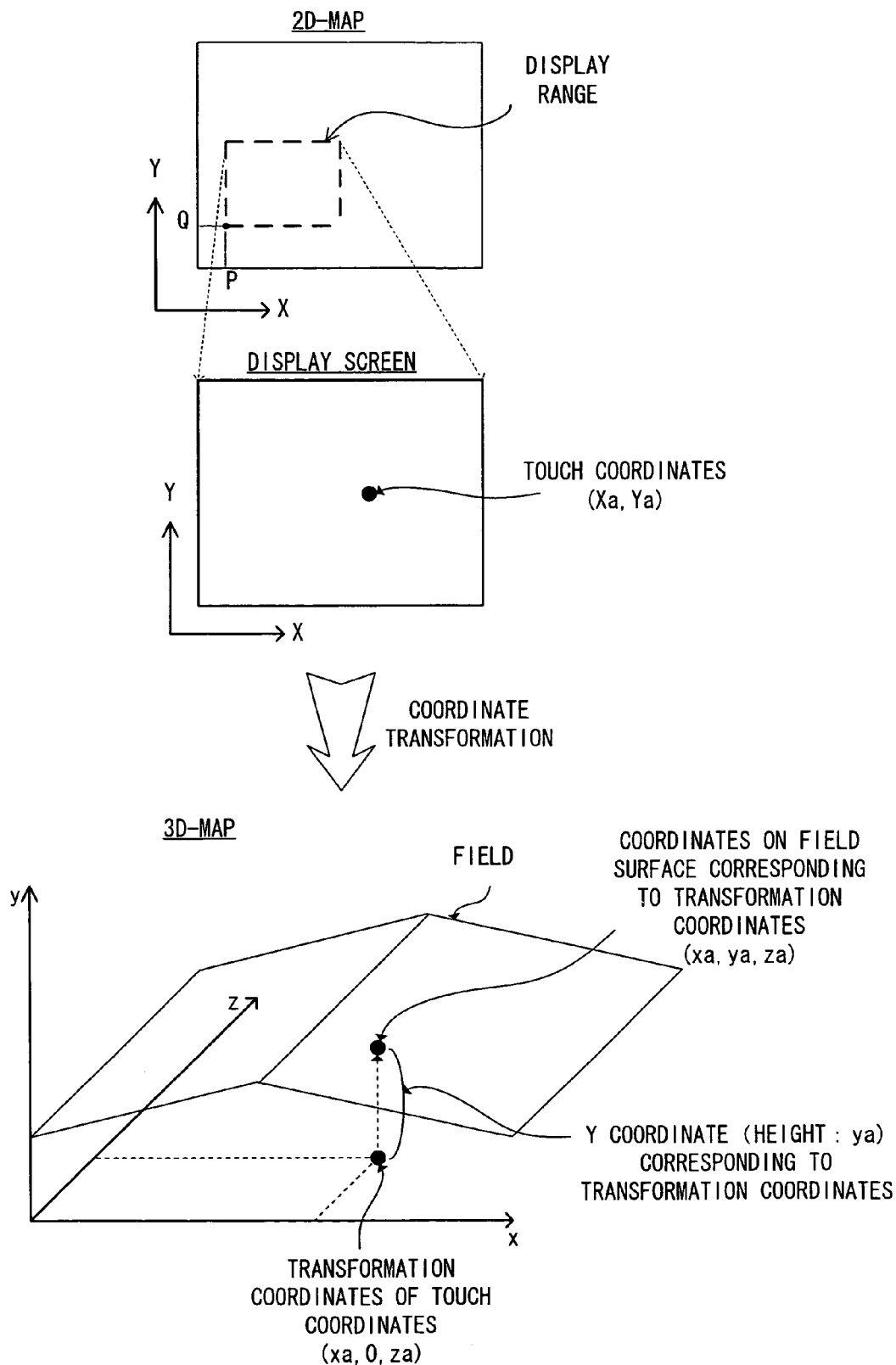
FIG. 11 is an illustrative view explaining a coordinates transformation of an input coordinates.

FIG. 11 shows an illustrative view for explaining a coordinate transformation. As shown in FIG. 11, the display screen of the LCD 14 displays a display range with a predetermined area of the two-dimensional map image in the virtual game world. In this embodiment, the reference length in the X-Y coordinate system of the two-dimensional map screen to be displayed when an input trace is obtained and the reference length in the X-Y coordinate system of the operation surface of the touch panel 22 are equal to each other. It should be noted that in order to catch the player character 70 within the map screen, the original point of the display range is moved according to the position of the player character 70. Accordingly, the detected coordinates of the touch panel 22 has to be transformed to the coordinates of the two-dimensional map image. That is, assuming that the coordinates of the original point of the display range in the two-dimensional map image is (P, Q), the coordinates corresponding to the touch coordinates (Xa, Ya) in the two-dimensional map image is (Xa-P, Ya-Q). P and Q are variables, and are set in correspondence to the position of the player character 70 and a width of the display range. Also the touch coordinates (Xa-P, Ya-Q) in the two-dimensional map image is coordinates where a dot image showing a trace is reduced.

In addition, the reference length in the X-Y coordinate system on the two-dimensional map screen to be displayed when an input trace is obtained and the reference length in the x-y-z coordinate system in the virtual three-dimensional world are brought into correspondence with each other at a predetermined coefficient k (k>1). If both of them are brought into correspondence with each other at one to ten ratio like the embodiment, the value of the coefficient k is set to 10. Furthermore, the X axis and Y axis on the two-dimensional map screen are set so as to become the same direction as the x axis and z axis in the virtual three-dimensional world. That is, the coordinates in the virtual three-dimensional world corresponding to the touch coordinates (Xa, Ya) becomes the coordinates on the xz plane in the virtual three-dimensional world.

Thus, the transformation coordinates (xa, 0, za) is calculated by ((Xa-P)×k, 0, (Y-Q)×k).

In the virtual three-dimensional world, a land object, such as a field (ground), etc. is provided, and on the ground, the player character 70, the item object 72, etc. are arranged. The axis in a direction of the height in the virtual three-dimensional world is the y axis. The original point (reference position) of the item object 72 is set to be the lowest point of the item object 72. Therefore, a moving trace of the item object 72 in the virtual three-dimensional world is calculated by setting the y coordinate of the transformation coordinates (xa, 0, za) to the coordinate on the ground. The coordinate ya of the height of the ground corresponding to the transformation coordinates position can be obtained from the map data of the virtual three-dimensional world. Thus, it is possible to calculate the coordinates (xa, ya, za) on the moving trace of the item object 72 in the virtual three-dimensional world. It should be noted that if the original point of the item object 72 is set to a position higher than the lowest point, the height of the original point is added to the height ya of the ground to calculate the y coordinate of the moving trace.

It should be noted that the touch coordinates may be subjected to a coordinate transformation on the basis of a predetermined transformation equation as described above in this embodiment. However, in another embodiment, in a case that the two-dimensional map screen is fixed, and so forth, that is, in a case that the coordinates transformation is not required, table data that brings the touch coordinates into correspondence with the coordinates in the virtual three-dimensional game world is stored in advance to thereby detect the transformation coordinates or the moving trace coordinates by the data.

Returning to FIG. 10, in the player character controlling program storing area 88, a program for controlling a movement and a state of the player character 70 is stored. By the program, the position data indicating the coordinates of the player character 70 in the virtual three-dimensional world, the position data indicating the coordinates of the symbol 70*a* in the two-dimensional map image, data designating the equipped item of the player character 70, etc. are set and updated.

In the item object controlling program storing area 90, a program for controlling a movement and a state of the item object 72 is stored. By the program, the position data indicating the coordinates of the item object 72 in the virtual three-dimensional world, the position data indicating the coordinates of the symbol 72*a* in the two-dimensional map image, kind data of the item object 72, etc. are set and updated. The coordinates of the position data of the item object 72 in the virtual three-dimensional world is set to the coordinates of the moving trace calculated by the above-described coordinate transformation in the three-dimensional world.

In the screen display controlling program storing area 92, a program for controlling generation and display of the screen is stored. By the program, the position data of the center of interest and the camera position data for generating the three-dimensional game screen are set and updated. Also, this program controls switching of the display between the three-dimensional game screen and the two-dimensional map screen on the LCD 12 and the LCD 14.

In the image data storing area 94, image data for displaying the player character 70, the item object 72, the symbol 70*a* of the player character 70, the symbol 72*a* of the item object 72, the land object, the background object, etc. are stored.

In the map data storing area 96, the map data of the virtual three-dimensional game world is stored. The map data is data showing a design of the virtual three-dimensional game world, and includes position data and image designation data, etc. of an object fixedly provided, such as a land object, and the like. The y coordinate ya of the moving trace of the item object 72 in the virtual three-dimensional world is obtained from the y coordinate of the ground object (ground) included in the map data in a corresponding position.

In the two-dimensional map image data storing area 98, the image data of the two-dimensional map in the virtual three-dimensional game world is stored. The two-dimensional map is a plane view obtained when viewing the virtual three-dimensional game world from directly above. The above-described two-dimensional map screen is generated from the two-dimensional map image so as to be displayed. If a part of the virtual three-dimensional game world is represented by one piece of map image data, a plurality of pieces of two-dimensional map image data are stored. It should be noted that in this embodiment, the two-dimensional map image data is prepared in advance, but in another embodiment, the two-dimensional map screen may be generated from the map data of the virtual three-dimensional space.

In the touch input data storing area 100, the touch input data to be detected by a touch input detecting program is stored. The touch input data includes data indicative of the presence or absence of the touch input and the detected coordinates data.

In the coordinates counter storing area 102, a variable for counting the number of the touch coordinates to be stored as an input trace by the input trace obtaining program is stored.

In the input trace data storing area 104, the input trace data obtained by the input trace obtaining program is stored. As input trace data, as shown in FIG. 12, the touch coordinates (Xa, Ya), the transformation coordinates (xa, 0, za), etc. are stored in correspondence to the coordinates counter value. The transformation coordinates (xa, 0, za) are calculated by ((Xa-P)×k, 0, (Y-Q)×k) as described above. The x coordinate and the z coordinate of the moving trace of the item object 72 in the virtual three-dimensional world are obtained from the transformation coordinates of the input trace data. The coordinates (Xa-P, Ya-Q) corresponding to the touch coordinates (Xa, Ya) in the two-dimensional map image may also be stored in correspondence with the coordinates counter value.

Returning to FIG. 10, in the player character position data storing area 106, the position coordinates of the player character 70 in the virtual three-dimensional game world, the position coordinates of the symbol 70*a* in the two-dimensional map image, etc. are stored.

In the item object position data storing area 108, the position coordinates of the item object 72 in the virtual three-dimensional game world, the position coordinates of the symbol 72*a* in the two-dimensional map image, etc. are stored. The initial value of the position coordinates of the item object 72 in the virtual three-dimensional game world is set to a predetermined position coordinates adjacent to the position coordinates of the player character 70 at a time of display, for example. The position coordinates of the item object 72 from that time is set to the coordinates of the moving trace data calculated from the input trace data, and sequentially updated to the coordinates corresponding to the next coordinates counter value. The coordinates (xa, ya, za) of the moving trace is calculated from the transformation coordinates (xa, 0, za) and the y coordinate ya of the map data in a position corresponding to the transformation coordinates as described above. The initial value of the position coordinates of the symbol 72*a* is set to a predetermined position coordinates adjacent to the symbol 70*a* of the player character 70, for example. The position coordinates of the symbol 72*a* after that is set on the basis of the coordinates (Xa-P, Ya-Q) on the two-dimensional map image corresponding to the touch coordinates, and sequentially updated to the coordinates corresponding to the next coordinates counter value.

In the center of interest data storing area 110, the coordinates data of the center of interest for generating the three-dimensional game screen is stored. The center of interest is basically set to the position coordinates of the player character 70. It should be noted that in a case that movement of the item object 72 is displayed, the center of interest is set to the position coordinates of the item object 72. In the camera position data store area 112, the coordinates data of the virtual camera for generating the three-dimensional game screen is stored. The position of the virtual camera is moved according to the movement of the center of interest, for example. When the movement of the item object 72 is displayed, the position of the virtual camera is set to have a shorter distance to the center of interest than in a case that the player character 70 is displayed.

Figure 13:
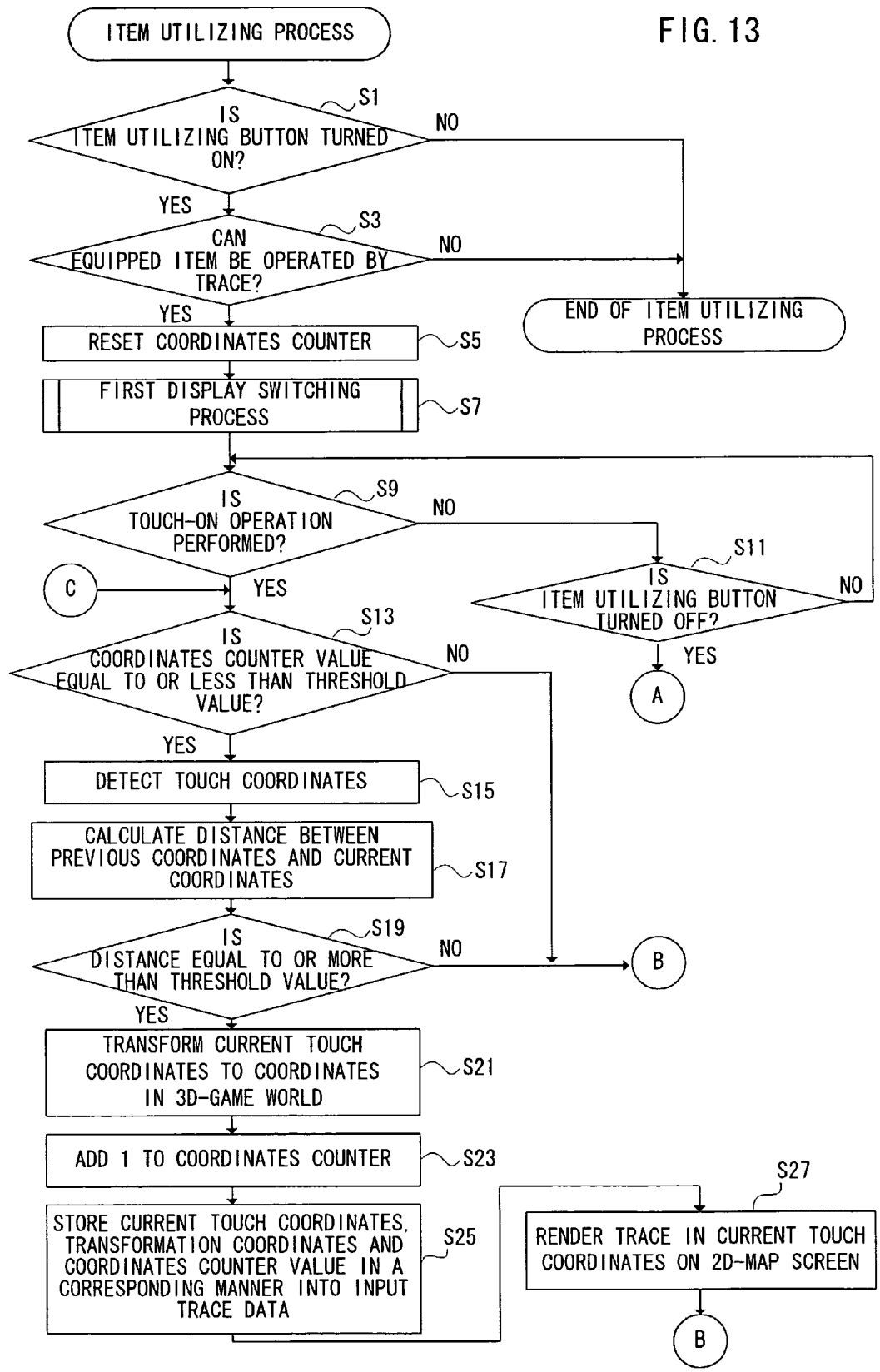
FIG. 13 is a flowchart showing a part of an example of the operation in an item utilizing process of the information processing apparatus in FIG. 1 embodiment.
Figure 14:
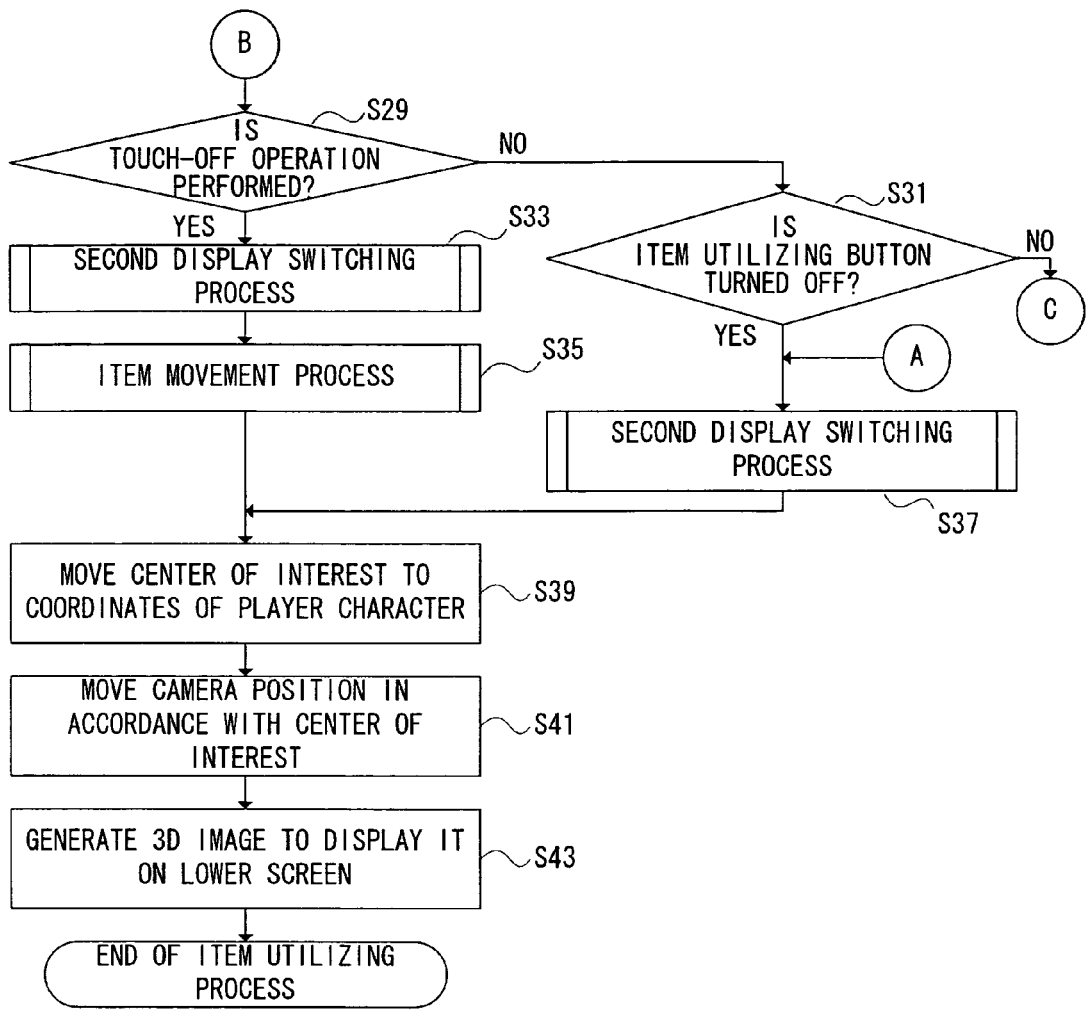
FIG. 14 is a flowchart continued from FIG. 13.

FIG. 13 and FIG. 14 show one example of an operation of an item utilizing process of the game apparatus 10 in this embodiment. It should be noted that the item utilizing process is a part of the main game process while a game is advanced by another game process not shown. For example, as shown in FIG. 3, the LCD 14 displays a three-dimensional game screen, and the LCD 12 displays a two-dimensional map screen. It should be noted that in the display process shown in FIG. 3, "0" is stored in the register 62 of the LCD controller 60 as a default value. That is, the CPU core 42 shall display a screen generated on the VRAM 56 by utilizing the GPU 50 on the LCD 12, and shall display a screen generated on the VRAM 58 by utilizing the GPU 52 on the LCD 14.

In a first step S1 in FIG. 13, the CPU core 42 determines whether or not the item utilizing button 20L is turned on. More specifically, the CPU core 42 obtains operation data of the operating switch 20 from the buffer of the I/F circuit 54, and determines whether or not data indicative of the presence of an operation of the L button 20L is included in the operation data. If "NO" in the step S1, item utilization is not instructed by the player, and therefore, the item utilizing process is ended.

Alternatively, if "YES" in the step S1, the CPU core 42 determines whether or not the kind of the equipped item of the player character 70 is a type allowing a trace operation in a step S3. The data indicative of the kind of the item equipped by the player character 70 is stored in the data storage area 82. If "NO" in the step S3, the equipped item cannot be utilized, and therefore, the item utilizing process is ended.

On the other hand, if "YES" in the step 3, that is, if the item can be utilized, the CPU core 42 resets the coordinates counter value in a step S5, and stores a default value "0" in the coordinates counter storing area 102. It should be noted that the coordinates of the input trace is stored in correspondence to the coordinates counter, and therefore, the reset process allows the input trace obtained in the past process to be cancelled.

Also, in a step S7, the CPU core 42 executes a first display switching process. Thus, the display screen is switched such that an input of a trace can be made on the two-dimensional map screen showing a range wider than that of the three-dimensional game screen. One example of an operation of the first display switching process is shown in FIG. 15.

Figure 15:
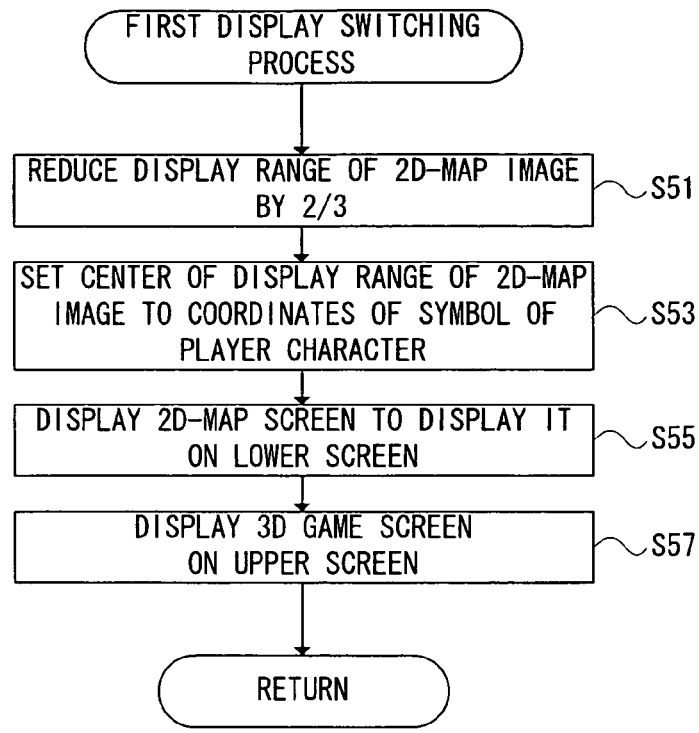
FIG. 15 is a flowchart showing one example of an operation of a first display switching process in FIG. 13.

In a first step S51 shown in FIG. 15, the CPU core 42 reduces a width of the display range of the two-dimensional map image by ⅔ of the current image (map screen of the upper screen in FIG. 3), for example and stores it in the data storage area 82. That is, the scale of the two-dimensional map image is enlarged by 1.5 times.

Next, in a step S53, the CPU core 42 sets the center of the display range of the two-dimensional map image to the position coordinates of the symbol 70a of the player character 70. That is, the CPU core 42 sets the coordinates (P, Q) of the original point of the display range such that the center of the display range is coincident with the symbol 70a of the player character 70, and stores it in the data storage area 82. The position coordinates of the symbol 70a is stored in the player character position data storing area 106.

Then, in a step S55, the CPU core 42 generates a two-dimensional map screen on the basis of the image data, the two-dimensional map image data, the display range data previously set, etc., and displays it on the lower screen (LCD 14) (see FIG. 4). For example, the CPU core 42 generates the data for displaying the two-dimensional map screen in the VRAM 56 by utilizing the GPU 50, and displays the two-dimensional map screen on the LCD 14 by utilizing the LCD controller 60 which sets "1" to the register 62. In this embodiment, during input of the trace, the three-dimensional game screen of the upper screen is not changed, so that the data for displaying the three-dimensional game screen generated in the VRAM 58 for displaying the lower screen is useable as it is. Thus, rewriting the data value of the register 62 of the LCD controller 60 to "1" makes it possible to address the screen switching. It should be noted that it may be possible to generate data for displaying the two-dimensional map screen in the VRAM 58 by utilizing the GPU 52 without rewriting the register 62 to display the map screen on the LCD 14.

Also, in a step S57, the CPU core 42 displays a three-dimensional game screen on the upper screen (LCD 12) (see FIG. 4). As described above, in this embodiment, the CPU core 42 rewrites the register 62 to "1" to thereby display the screen on the LCD 12 by utilizing the data of the three-dimensional game screen generated in the VRAM 58. It should be noted that the CPU core 42 can generate data for displaying the three-dimensional game screen in the VRAM 56 by utilizing the GPU 50 without rewriting the register 62 on the basis of the image data, the map data for the virtual three-dimensional world, the player character position data, the center of location data, the camera position data, etc., and display the three-dimensional game screen on the LCD 12 by utilizing the LCD controller 60. After completion of the step S57, the first display switching process is ended, and the process in FIG. 13 returns to a step S9.

Returning to FIG. 13, in the step S9, the CPU core 42 obtains output data of the touch panel 22 from the buffer of the I/F circuit 54 to store it in the touch input data storing area 100, and determines whether or not a touch-on is performed on the basis of the obtained touch input data. If "NO" in the step S9, that is, if a touch-off state is kept, the CPU core 42 obtains the operation data, and determines whether or not the item utilizing button 20L is turned off in a step S11. If "NO" in the step S11, that is, if the item utilizing button 20L is turned on, the process returns to the step S9.

On the other hand, if "YES" in the step S9, that is, when a touch-input is started, an input trace starts to be obtained. The CPU core 42 determines whether or not the coordinates counter value is equal to or less than a predetermined threshold value in a step S13. If "YES" in the step S13, that is, if the number of coordinates of the input trace data does not exceed an upper limit, the CPU core 42 detects coordinates of a touch position (touch coordinates) from the touch input data in a step S15. Succeedingly, in a step S17, the CPU core 42 calculates a distance from the touch coordinates previously stored as an input trace data and the current touch coordinates currently detected. It should be noted that the default value of the previous coordinates is set to the coordinates away from the coordinates detectable as a touch coordinates by a distance exceeding a threshold value, and whereby, if the coordinates counter value is a default value, that is, if a touch input is started, a distance exceeding the threshold value is calculated.

Next, in a step S19 the CPU core 42 determines whether or not the calculated distance is equal to or more than the predetermined threshold value. The threshold value of the distance is set to the predetermined value capable of eliminating changes of the coordinates due to hand shaking. If "YES" in the step S19, that is, it is regarded an trace input, the CPU core 42 transforms the current touch coordinates to the coordinates in the virtual three-dimensional game world in a step S21. That is, according to the above-described predetermined transformation equation, the transformation coordinates (xa, 0, za) is calculated from the touch coordinates (Xa, Ya).

In addition, in a step S23, the CPU core 42 adds "1" to the coordinates counter value to update the coordinates counter storing area 102.

Then, in a step S25, the CPU core 42 additionally stores the current touch coordinates, the transformation coordinates, and the coordinates counter value in a corresponding manner in the input trace data storing area 104. Thus, the input trace data as shown in FIG. 12 is stored.

Succeedingly, in a step S27, the CPU core 42 render a dot image showing a trace with respect to the current touch coordinates on the two-dimensional map screen by utilizing the GPU 50, etc. on the basis of the image data, the current touch coordinates data, etc. Thus, a trace is rendered on the two-dimensional map screen displayed on the LCD 14 as shown in FIG. 5, for example. After completion of the step S27, the process proceeds to a next step S29 in FIG. 14.

On the other hand, if "NO" in the step S19, that is, if coordinates to be regarded as hand shaking is detected, the process proceeds to the step S29 in FIG. 14 without capturing the detected coordinates to the input trace. Also, if "NO" in the step S13, that is, if the input trace having the number of coordinates more than predetermined value has already been stored, the input trace is not obtained, and the process proceeds to the step S29 in FIG. 14.

If "YES" in the step S11, that is, if the item utilizing button 20L is turned off before the input trace is obtained, item utilization is canceled, and therefore, the process proceeds to a step S37 in FIG. 14.

In the step S29 in FIG. 14, the CPU core 42 obtains the touch input data from the buffer of the I/F circuit 54 so as to store it in the touch input data storing area 100, and determines whether or not a touch-off is performed on the basis of the touch input data. If "NO" in the step S29, that is, if a touch input is continued, in a step S31, the CPU core 42 determines whether or not the item utilizing button 20L is turned off similarly to the step S11. If "NO" in the step S31, that is, if the item utilizing button 20L continues to be depressed, the process returns to the step S13 in FIG. 13. Thus, if the touch input is continued, and the operation of the item utilizing button 20L is continued, the input trace obtaining process from the steps S13 to S27 is repeated.

In this embodiment, as described above, the touch-off is a necessary condition for starting to move the item object 72. If "YES" in the step S29, that is, if a touch-off state is detected, a process of moving the item object 72 is started. That is, the CPU core 42 first executes a second display switching process in a step S33. This makes it possible to switch the display screen such that movement of the item object 72 in the virtual three-dimensional world is displayed on the three-dimensional game screen of the lower screen. One example of an operation of the second display switching process is shown in FIG. 16.

Figure 16:
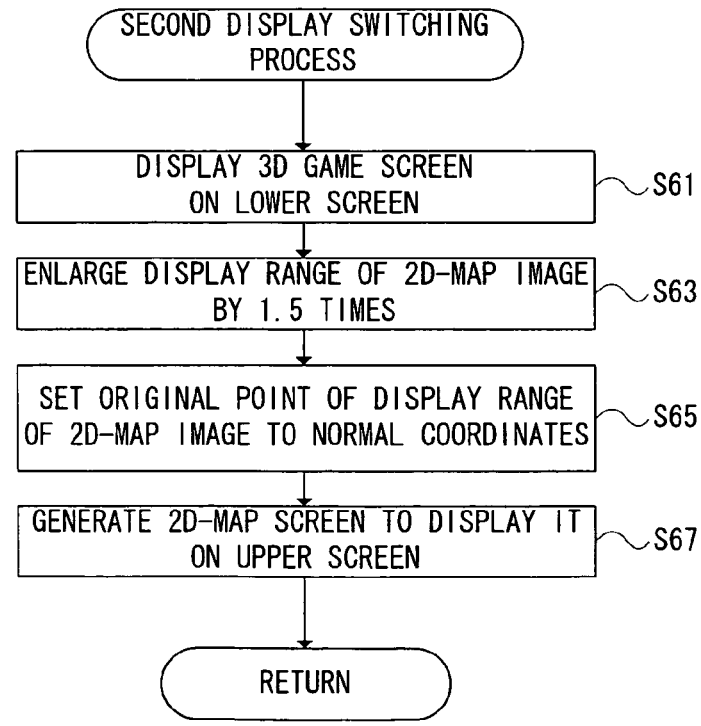
FIG. 16 is a flowchart showing one example of an operation of a second display switching process in FIG. 14.

In a step S61 in FIG. 16, the CPU core 42 displays a virtual three-dimensional game screen on the lower screen (LCD 14) on the basis of the image data, the map data of the virtual three-dimensional game world, the player character position data, the item object position data, the center of interest data, the camera position data, etc. (see FIG. 6). For example, if a value of the register 62 is set to "1" in the first display switching process in the above-described step S7, the value of the register 62 is rewritten by "0" to generate the data for displaying the three-dimensional game screen in the VRAM 58 by utilizing the GPU 52, and to display the three-dimensional game screen by utilizing the LCD controller 60 on the LCD 14. As shown in FIG. 6, on the game screen, the item object 72 is displayed in the coordinates of the item object position data.

In a step S63, the CPU core 42 enlarges the width of the display range of the two-dimensional map image by 1.5 times of the current image (the map screen on the lower screen in FIG. 5, for example), and stores it in the data storage area 82. That is, the scale of the two-dimensional map image is reduced by ⅔ times of the current image.

In addition, in a step S65, the CPU core 42 sets the original point of the display range of the two-dimensional map image to a normal coordinates to be defined in advance, and stores it in the data storage area 82.

Then, in a step S67, the CPU core 42 creates a two-dimensional map screen by utilizing the GPU 50, etc. on the basis of the image data, the two-dimensional map image data, the previously set display range data, the position data of the symbol 70a of the player character 70, position data of the symbol 72a of the item object 72, the input trace data, etc., and displays the map screen on the upper screen (LCD 12). As shown in FIG. 6, on the two-dimensional map screen, the symbol 72a of the item object 72 and the input trace are displayed. After completion of the step S67, the second display switching process is ended, and then, the process returns to the step S35 in FIG. 14.

Returning to FIG. 14, in the step S35, the CPU core 42 executes an item moving process. This makes it possible to display a scene in which the item object 72 moves in the virtual three-dimensional game space along the input trace. One example of an operation of the item moving process is shown in FIG. 17.

Figure 17:
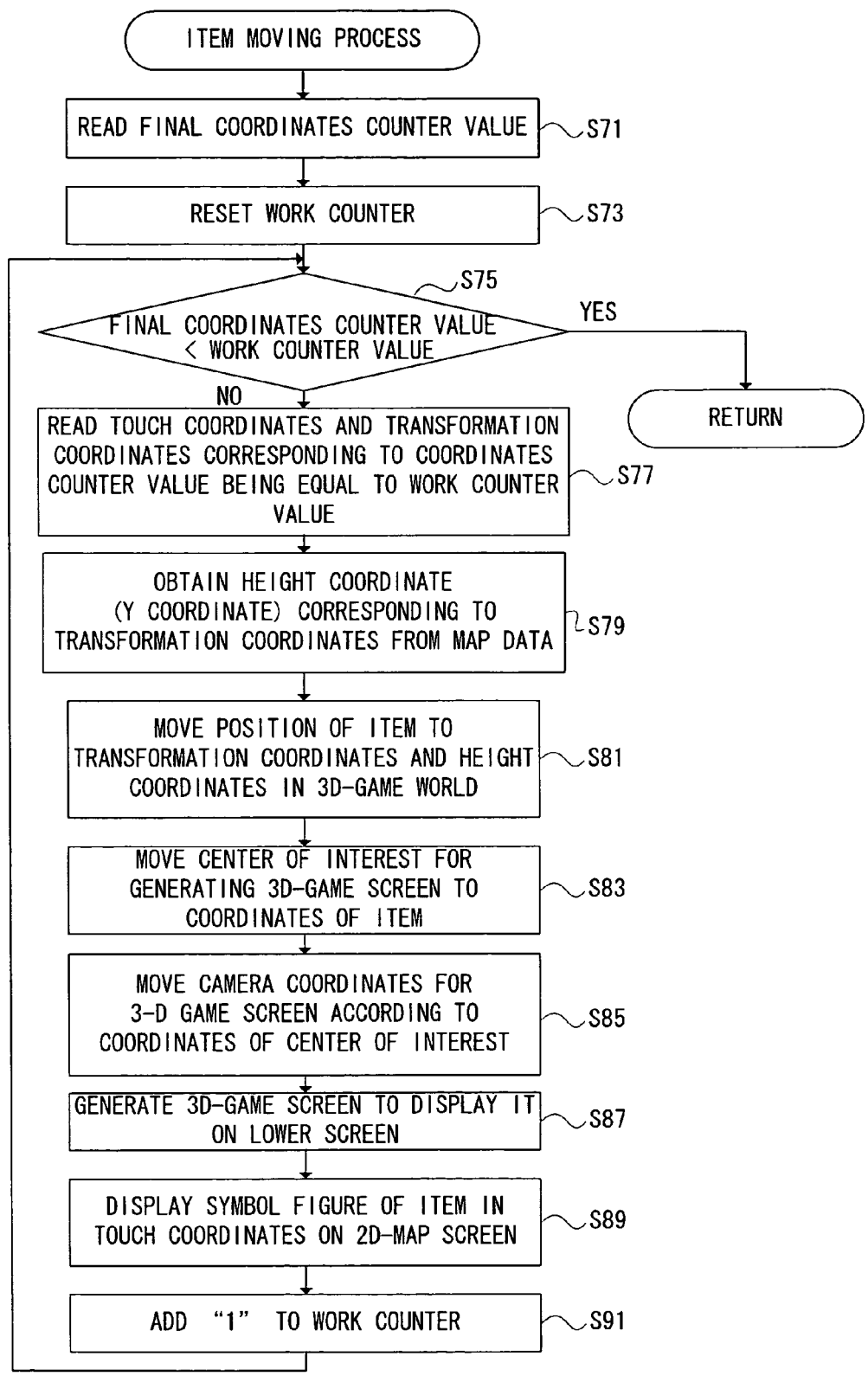
FIG. 17 is a flowchart showing one example of an operation of an item movement process in FIG. 14.

In a step S71 in FIG. 17, the CPU core 42 reads a final coordinates counter value stored in the coordinates counter storing area 102. Next, in a step S73, the CPU core 42 provides a work counter in the data storage area 82 to reset the work counter, and store the default value ("1", for example).

Then, in a step S75, the CPU core 42 determines whether or not the final coordinates counter value is smaller than the work counter value. That is, it is determined whether or not the movement process of the input trace to the last coordinates is completed.

If "NO" in the step S75, the CPU core 42 reads the touch coordinates and the transformation coordinates corresponding to the coordinates counter value being equal to the work counter value are read from the input trace data storing area 104 in a step S77. Also, in a step S79, the CPU core 42 obtains the height coordinates (y coordinate) corresponding to the transformation coordinates from the map data storing area 96.

Succeedingly, in a step S81, the CPU core 42 moves the position of the item object 72 to the transformation coordinates and the height coordinates in the virtual three-dimensional game world. That is, the position data in the virtual three-dimensional game world stored in the item object position data store area 108 is set to the coordinates obtained form the transformation coordinates and the height coordinates.

Also, in a step S83, the CPU core 42 moves the center of interest for generating the three-dimensional game screen to the coordinates of the item object 72. That is, the coordinates of the item object 72 in the virtual three-dimensional world set in the step S81 is stored in the center of interest data storing area 110. In a succeeding step S85, the CPU core 42 moves the camera coordinates for generating the three-dimensional game screen according to the coordinates of the center of interest. For example, the coordinates of the virtual camera is anew calculated such that the virtual camera looks down on the center of interest from an obliquely above, then follows the center of interest with a predetermined distance, and is stored in the camera position data storing area 112. It should be noted that the distance between the virtual camera and the center of interest is set to a distance shorter than a case that the center of interest focuses on the player character 70.

Next, in a step S87, the CPU core 42 generates the three-dimensional game screen by utilizing the GPU 52, etc., and displays it on the lower screen (LCD 14) similarly to the above-described step S61, and the like. Thus, a screen in which the item object 72 moves along the moving trace on the basis of the input trace in the virtual three-dimensional game world is displayed on the LCD 14 as shown in FIG. 7.

Also, in a step S89, the CPU core 42 displays the symbol 72a of the item object 72 in a position corresponding to the touch coordinates on the two-dimensional map screen to be displayed on the upper screen similarly to the above-described step S67, etc. Thus, as shown in FIG. 7, a screen on which the symbol 72a of the item object 72 moves along the input trace on the two-dimensional map is displayed on the LCD 12. It should be noted that the dot image representing a trace at a position corresponding to the coordinates on which the item has moved of the input trace is erased.

Succeedingly, in a step S91, the CPU core 42 adds "1" to the work counter value to update the work counter storing area not shown. After completion of the step S91, the process returns to the step S75.

Thus, a movement process to a position corresponding to a next coordinates of the input trace is successively executed, and a screen in which the item object 72 moves to a position corresponding to the last coordinates of the input trace is displayed. Then, if "YES" in the step S75, the item moving process is ended, and then, the process returns to the step S39 in FIG. 14.

Returning to FIG. 14, if "YES" in the step S31, that is, if an instruction of canceling the item utilization is detected before a touch-off operation, the process proceeds to the step S37 to suspend the movement control of the item object 72 on the basis of the input trace which has been obtained at that time. In the step S37, the CPU core 42 executes the above-described second display switching process (FIG. 16). Thus, as shown in FIG. 6, the three-dimensional game screen is displayed on the lower screen, and the two-dimensional map screen is displayed on the upper screen. It should be noted that since utilizing the item is cancelled, the images of the item object 72, the symbol 72a, and the input trace are not displayed unlikely to the second display switching process in the above-described step S33. It should be noted that before rendering the screen in the step S37, the input trace data stored in the input trace data storing area 104 is cleared to prevent the input trace from being rendered. After completion of the step S37, the process proceeds to a step S39.

In the step S39, the CPU core 42 moves the center of interest to the coordinates of the player character 70. That is, the coordinates of the player character position data in the virtual three-dimensional game world is stored in the center of interest data storing area 110. Succeedingly, in a step S41, the CPU core 42 moves the camera position in accordance with the center of interest. That is, the camera position coordinates is updated on the basis of a predetermined relationship between the center of interest and the virtual camera position for photographing the player character 70. Then, in a step S43, the CPU core 42 generates a three-dimensional game screen by utilizing the GPU 52 similarly to the above-described step S61, etc., and displays it on the LCD 14. Thus, the game screen as shown in FIG. 9 is displayed. After completion of the step S43, the item utilizing process is ended.

According to this embodiment, an input trace can be obtained from the two-dimensional map screen (second screen) showing a range wider than a range displayed on the three-dimensional game screen (first screen). Then, the item object 72 is moved along the input trace in the virtual three-dimensional game space, and the movement of the item object 72 is displayed on the first screen. Thus, a trace for moving the item object 72 can be input to the second screen on which a wider range is displayed, and therefore, it is possible to move the item object 72 along the input trace in a wider range.

For example, if the main screen (first screen) on which the player character 70, and the item object 72 and its surroundings are illustrated in detail and utilized for various operations and the map screen (second screen) on which a wider range of the virtual world is illustrated to provide information such as an overall condition, outlines, etc. of the world are displayed, the player can perform a trace input, that is, a moving instruction operation of the object 72 intuitively and in a wider range on the map screen by utilizing the touch panel 22 while obtaining an extensive set of information which cannot be informed on the main screen, and can reflect a result of the operation input on the main screen. Therefore, it is possible to easily move the object 72 to an area outside the range to be displayed on the first screen, and to easily perform an action exerting an influence on the area, capable of providing a contrivance having high strategic characteristics and taste.

It should be noted that in the above-described embodiment, when a touch input is started, an input trace starts to be stored. However, in another embodiment, when it is determined that a touch input is started, it may be determined whether or not the detected coordinates at that time is within a fixed distance from the player character 70. Then, when it is determined that the coordinates is within the fixed range form the player character 70, an input trace may start to be stored, and if not, the detected coordinates may not be stored as an input trace.

Furthermore, in each of the above-described embodiments, the item object 72 equipped by the player character 70 is moved along the input trace. However, in another embodiment, the player character 70 itself may be moved along the input trace.

Also, in each of the above-described embodiments, if the second area with a relatively wider range of the virtual three-dimensional game world is displayed, the two-dimensional map screen (two-dimensional image) is utilized as a second screen showing a second area to represent the virtual world in a two-dimensional manner. If a first area showing a relatively narrower range of the virtual three-dimensional game world is displayed, a three-dimensional game screen (three-dimensional image) is utilized as a first screen showing a first area to represent the virtual world in the three dimensional manner. However, in another embodiment, both of the first screen and the second screen can be represented by the three-dimensional image, or both of the first screen and the second screen can be represented by the two-dimensional image.

Furthermore, in each of the above-described embodiment, the virtual space is three dimensional, but the virtual space may be two dimensional. In such a case, both of the first screen and the second screen are represented by utilizing the two-dimensional image.

Also, in each of the above-described embodiments, a coordinates is input with the touch panel 22 provided on the LCD 14. However, as such an input means, any devices, which can instruct a position (coordinates) on the screen, is applicable, and in another embodiment, another pointing device, such as a track pad, a tablet, or the like may be applied. Additionally, if a pointing device which points a position by a moving direction and an amount of movement (velocity), such as a mouse, track ball, etc. is applied, a cursor is displayed on the display screen to indicate an input position. Also, state in which a button of a mouse, etc. is depressed is regarded as a touch-on state, and a state in which the button is released is regarded as a touch-off state, and whereby, the presence or absence of an input can be determined with the pointing device.

In each of the above-descried embodiment, although the first LCD 12 and the second LCD 14 are vertically arranged, the positions of the two LCDs can be changed as necessary. In the game apparatus 10 of another embodiment, the first LCD 12 and the second LCD 14 may horizontally be arranged.

Additionally, in each of the above-described embodiments, although two game screens are respectively provided on the two LCDs, the number of the LCDs as a display means can be changed as necessary. For example, in the game apparatus 10 of another embodiment, one vertically-long LCD is prepared, and by vertically dividing the display area into two, and the two game screens may respectively be displayed on the display areas. Or, one horizontally-long LCD is prepared, and by horizontally dividing the display area into two, two game screens may respectively be displayed on the display areas.

Also, in each of the above-described embodiments, the two game screens are simultaneously displayed on the two display areas. However, in another embodiment, two game screens may be individually displayed on display area through change of the two game screens. For example, in general, a first screen showing a relatively narrow range of the virtual world is displayed on the LCD 14. If a trace is obtained according to the fact that a condition such as an operation of the item utilizing button 20L, or a kind of the equipped item, etc is satisfied, a second screen showing a relatively wider range of the virtual world is displayed on the LCD 14 in the first display switching process. Then, if the obtainment of the trace is ended to start to move the object according to the fact that a condition such as detection of a touch-off operation, etc. is satisfied, the first screen is displayed on the LCD 14 by the second display switching process again. Thus, in a case that displaying is made on the only one display area, only the lower screens shown in the above-described FIG. 3 to FIG. 9 are successively displayed, for example.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an object movement controlling program of an information processing apparatus which displays on a display device an object moving in a virtual space in response to an input by an input device, said object movement controlling program causes a processor of said information processing apparatus to execute:

controlling a display by displaying on said display device a first screen showing a first area in said virtual space and a second screen showing a second area in said virtual space wider than said first area simultaneously or through change, detecting coordinates input by said input device to said second screen displayed on said display device, obtaining a trace by storing in a storing memory an input trace indicated by the coordinates successively detected by said detecting step, controlling movement of said object by moving said object along said coordinates in said virtual space corresponding to said stored input trace, and displaying on said first screen movement of said object by said controlling movement.

2. The non-transitory storage medium storing an object movement controlling program according to claim 1, wherein said controlling movement includes transforming said stored input trace to coordinates in said virtual space.

3. The non-transitory storage medium storing an object movement controlling program according to claim 2, wherein said virtual space is a virtual three-dimensional space, and said transforming transforms said input trace into three-dimensional coordinates in said virtual three-dimensional space on the basis of two-dimensional coordinates of said stored input trace and map data of said virtual three-dimensional space stored in said storing memory in advance.

4. The non-transitory storage medium storing an object movement controlling program according to claim 3, wherein said displaying movement of the object generates said first screen on the basis of the center of interest moved according to the movement of said object by said movement controlling step.

5. The non-transitory storage medium storing an object movement controlling program according to claim 2, wherein said displaying movement of the object generates said first screen on the basis of the center of interest moved according to the movement of said object by said movement controlling step.

6. The non-transitory storage medium storing an object movement controlling program according to claim 2, wherein said controlling the display represents said virtual space in a three-dimensional manner as said first screen, and represents said virtual space in a two dimensional manner as said second screen.

7. The non-transitory storage medium storing an object movement controlling program according to claim 2, wherein said input device includes a touch panel provided on the display screen of said display device, said obtaining the trace stores as said input trace coordinates successively detected by said detecting step since an input state to the touch panel has come, and said controlling the movement of said object starts to move said object when a no-input state to said touch panel has come.

8. The non-transitory storage medium storing an object movement controlling program according to claim 2, wherein said obtaining the trace, when the number of coordinates as said input trace exceeds a fixed value, does not store as said input trace the coordinates to be detected from that time by said detecting.

9. The non-transitory storage medium storing an object movement controlling program according to claim 2, wherein
said obtaining the trace, when the coordinates to be detected by said detecting is moved by a fixed distance or more from the previously stored coordinates as said input trace, stores said detected coordinates as said input trace.

10. The non-transitory storage medium storing an object movement controlling program according to claim 3, wherein
said controlling the display represents said virtual space in a three-dimensional manner as said first screen, and represents said virtual space in a two dimensional manner as said second screen.

11. The non-transitory storage medium storing an object movement controlling program according to claim 3, wherein
said input device includes a touch panel provided on the display screen of said display device,
said obtaining the trace stores as said input trace coordinates successively detected by said detecting step since an input state to the touch panel has come, and
said controlling the movement of said object starts to move said object when a no-input state to said touch panel has come.

12. The non-transitory storage medium storing an object movement controlling program according to claim 3, wherein
said obtaining the trace, when the number of coordinates as said input trace exceeds a fixed value, does not store as said input trace the coordinates to be detected from that time by said detecting.

13. The non-transitory storage medium storing an object movement controlling program according to claim 3, wherein
said obtaining the trace, when the coordinates to be detected by said detecting is moved by a fixed distance or more from the previously stored coordinates as said input trace, stores said detected coordinates as said input trace.

14. The non-transitory storage medium storing an object movement controlling program according to claim 1, wherein
said displaying movement of the object generates said first screen on the basis of a center of interest moved according to the movement of said object by said movement controlling step.

15. The non-transitory storage medium storing an object movement controlling program according to claim 1, wherein
said controlling the display represents said virtual space in a three-dimensional manner as said first screen, and represents said virtual space in a two dimensional manner as said second screen.

16. The non-transitory storage medium storing an object movement controlling program according to claim 15, wherein prior to said representing said virtual space in a three-dimensional manner as said first screen and said virtual space in a two dimensional manner as said second screen, the virtual space in the first screen is represented in a two-dimensional manner and the virtual space in the second screen is represented in a three-dimensional manner.

17. The non-transitory storage medium storing an object movement controlling program according to claim 1, wherein
said input device includes a touch panel provided on the display screen of said display device,
said obtaining the trace stores as said input trace coordinates successively detected by said detecting step since an input state to the touch panel has come, and
said controlling the movement of said object starts to move said object when a no-input state to said touch panel has come.

18. The non-transitory storage medium storing an object movement controlling program according to claim 17, wherein
said information processing apparatus further comprises an operating switch, and
said controlling the movement of said object stops moving said object when a predetermined instruction based on the operation data from said operating switch is detected before a no-input state to said touch panel has come.

19. The non-transitory storage medium storing an object movement controlling program according to claim 1, wherein
said obtaining the trace, when the number of coordinates as said input trace exceeds a fixed value, does not store as said input trace the coordinates to be detected from that time by said detecting.

20. The non-transitory storage medium storing an object movement controlling program according to claim 1, wherein
said obtaining the trace, when the coordinates to be detected by said detecting is moved by a fixed distance or more from the previously stored coordinates as said input trace, stores said detected coordinates as said input trace.

21. The non-transitory storage medium according to claim 1, wherein
said controlling the display on said display device such that the first screen shows the first area in said virtual space and the second screen shows the second area in said virtual space wider than said first area is performed by switching the screens from a prior state in which the first screen shows the second area in said virtual space wider than said first area and the second screen shows the first area.

22. The non-transitory storage medium according to claim 21, wherein the second area shown by the second screen has a reduced display range with respect to the second area shown by the first screen in the prior state.

23. The non-transitory storage medium according to claim 21, wherein said information processing apparatus further comprises a user-operable switch or button, and said switching is performed upon operation of the user-operable switch or button.

24. The non-transitory storage medium according to claim 1, wherein said object movement controlling program causes a processor of said information processing apparatus to further execute:
initiating a screen switching process so that the first screen showing the first area in said virtual space and the second screen showing the second area in said virtual space wider than said first area is switched to a subsequent state in which the first screen shows the second area in said virtual space wider than said first area and the second screen shows the first area.

25. The non-transitory storage medium according to claim 24, wherein said input device includes a touch panel provided over the second screen, and the screen switching process is initiated upon touch no longer being detected on the touch panel.

26. The non-transitory storage medium according to claim 24, wherein the second area shown by the second screen has a reduced display range with respect to the second area shown by the first screen in the subsequent state.

27. The non-transitory storage medium storing an object movement controlling program according to claim 1, wherein prior to said displaying the first screen showing the first area in said virtual space and the second screen showing the second area in said virtual space wider than said first area, an area displayed by the first screen is wider than that shown by the second screen.

28. The non-transitory storage medium storing an object movement controlling program according to claim 1, wherein said controlling movement of said object by moving said object along said coordinates in said virtual space corresponding to said stored input trace includes controlling movement of said object by moving said object along said coordinates in said virtual space corresponding to said stored input trace at a state that the coordinate input by the input device to the second screen becomes absent.

29. The non-transitory storage medium storing an object movement controlling program according to claim 1, wherein the display device includes a first display and a second display, the first display configured to display the first screen and the second display configured to display the second screen.

30. The non-transitory storage medium storing an object movement controlling program according to claim 1, wherein the display device includes a single display, the single display being configured to display both the first screen and the second screen.

31. An information processing apparatus which displays on a display device an object moving in response to an input by an input device in a virtual space, comprising:
    a display controller for displaying on said display device a first screen showing a first area in said virtual space and a second screen showing a second area in said virtual space wider than said first area simultaneously or through change,
    a detector for detecting coordinates input by said input device to said second screen displayed on said display device,
    a trace storage medium for storing an input trace indicated by the coordinates successively detected by said detector,
    a movement controller for moving said object along said coordinates in said virtual space corresponding to said input trace stored by said trace storage medium, and
    movement displaying programmed logic circuitry for displaying movement of said object on said first screen by said movement controller.

32. The information processing apparatus according to claim 31, wherein
    said movement controller transforms said stored input trace to said coordinates in said virtual space.

33. The information processing apparatus according to claim 32, wherein
    said virtual space is a virtual three-dimensional space, and
    said movement controller transforms said input trace into three-dimensional coordinates in said virtual three-dimensional space on the basis of two-dimensional coordinates of said stored input trace and map data of said virtual three-dimensional space.

34. The information processing apparatus according to claim 31, wherein
    said movement displaying programmed logic circuitry generates said first screen on the basis of a center of interest moved according to the movement of said object by said movement controller.

35. The information processing apparatus according to claim 31, wherein
    said display controller represents said virtual space in a three-dimensional manner as said first screen, and represents said virtual space in a two dimensional manner as said second screen.

36. The information processing apparatus according to claim 35, wherein prior to said representing said virtual space in a three-dimensional manner as said first screen and said virtual space in a two dimensional manner as said second screen, the virtual space in the first screen is represented in a two-dimensional manner and the virtual space in the second screen is represented in a three-dimensional manner.

37. The information processing apparatus according to claim 31, wherein
    said input device includes a touch panel provided on the display screen of said display device,
    said trace storage medium stores as said input trace coordinates successively detected by said detecting step since an input state to the touch panel has come, and
    said movement controller starts to move said object when a no-input state to said touch panel has come.

38. The information processing apparatus according to claim 31, wherein
    when the number of coordinates as said input trace exceeds a fixed value, said trace storage medium does not store as said input trace the coordinates to be detected from that time by said detector.

39. The information processing apparatus according to claim 31, wherein
    when the coordinates to be detected by said detecting is moved by a fixed distance or more from the previously stored coordinates as said input trace, said trace storage medium stores said detected coordinates as said input trace.

40. The information processing apparatus according to claim 31, wherein
    said information processing apparatus further comprises an operating switch or button, and
    said input device includes a touch panel provided over the second screen,
    said movement controller stops moving said object when a predetermined instruction based on operation data from said operating switch or button is detected before a no-input state to said touch panel has come.

41. The information processing apparatus according to claim 31, wherein
    the display controller displays on said display device the first screen showing the first area in said virtual space and the second screen showing the second area in said virtual space wider than said first area by switching the screens from a prior state in which the first screen shows the second area in said virtual space wider than said first area and the second screen shows the first area.

42. The information processing apparatus according to claim 41, wherein the second area shown by the second screen has a reduced display range with respect to the second area shown by the first screen in the prior state.

43. The information processing apparatus according to claim 41, wherein said information processing apparatus further comprises a user-operable switch or button, and said display controller performs said switching upon operation of the user-operable switch or button.

44. The information processing apparatus according to claim 31, wherein the display controller initiates a screen switching process so that the first screen showing the first area in said virtual space and the second screen showing the second area in said virtual space wider than said first area by switching the screens is switched to a subsequent state in which the first screen shows the second area in said virtual space wider than said first area and the second screen shows the first area.

45. The information processing apparatus according to claim 44, wherein said input device includes a touch panel provided over the second screen, and the display controller initiates the screen switching process upon touch is no longer being detected on the touch panel.

46. The information processing apparatus according to claim 44, wherein the second area shown by the second screen has a reduced display range with respect to the second area shown by the first screen in the subsequent state.

47. The information processing apparatus according to claim 31, wherein prior to said displaying the first screen showing the first area in said virtual space and the second screen showing the second area in said virtual space wider than said first area, an area displayed by the first screen is wider than that shown by the second screen.

48. The information processing apparatus according to claim 31, wherein the movement controller moves the object along the coordinates in the virtual space corresponding to the stored input trace at a state that the coordinate input by the input device to the second screen becomes absent.

49. The information processing apparatus according to claim 31, wherein the display device includes a first display and a second display, the first display configured to display the first screen and the second display configured to display the second screen.

50. The information processing apparatus according to claim 31, wherein the display device includes a single display, the single display being configured to display both the first screen and the second screen.

51. A method of controlling an information processing apparatus which displays on a display device an object moving in a virtual space in response to an input by an input device, the method comprising:
   controlling a display by displaying on said display device a first screen showing a first area in said virtual space and a second screen showing a second area in said virtual space wider than said first area simultaneously or through change,
   detecting coordinates input by said input device to said second screen displayed on said display device,
   obtaining a trace by storing in a storing memory an input trace indicated by the coordinates successively detected by said detecting step,
   controlling movement of said object by moving said object along said coordinates in said virtual space corresponding to said stored input trace, and
   displaying on said first screen movement of said object by said controlling movement.

52. The method according to claim 51, wherein prior to said displaying the first screen showing the first area in said virtual space and the second screen showing the second area in said virtual space wider than said first area, an area displayed by the first screen is wider than that shown by the second screen.

53. The method according to claim 51, wherein said controlling movement of said object by moving said object along said coordinates in said virtual space corresponding to said stored input trace includes controlling movement of said object by moving said object along said coordinates in said virtual space corresponding to said stored input trace at a state that the coordinate input by the input device to the second screen becomes absent.

54. The method according to claim 51, wherein the display device includes a first display and a second display, and the first display displays the first screen and the second display displays the second screen.

55. The method according to claim 51, wherein the display device includes a single display which displays both the first screen and the second screen.

56. A system configured to display on a display device an object moving in response to an input by an input device in a virtual space, the system comprising:
   a processing system, having at least one computer processor, configured to control a display by displaying on said display device a first screen showing a first area in said virtual space and a second screen showing a second area in said virtual space wider than said first area simultaneously or through change;
   a detector configured to detect coordinates input by said input device to said second screen displayed on said display device; and
   a non-transitory storage medium configured to store an input trace indicated by the coordinates successively detected by said detector,
   wherein the processing system is further configured to:
      move said object along said coordinates in said virtual space corresponding to said input trace stored by said non-transitory storage medium, and
      display movement of said object on said first screen.

* * * * *